US012465614B2

(12) United States Patent
Caliendo et al.

(10) Patent No.: US 12,465,614 B2
(45) Date of Patent: Nov. 11, 2025

(54) BUDESONIDE 21-PHOSPHATE SALTS AND PHARMACEUTICAL COMPOSITIONS CONTAINING THE SAME

(71) Applicant: GENETIC S.P.A., Castel San Giorgio (IT)

(72) Inventors: Giuseppe Caliendo, Marigliano (IT); Giuseppe Cirino, Naples (IT); Ferdinando Fiorino, Benevento (IT); Francesco Frecentese, Aversa (IT); Marcelo Nicolas Muscarà, Campinas (BR); Elisa Perissutti, Venafro (IT); Antonio Petti, Battipaglia (IT); Fiorentina Roviezzo, Bonea (IT); Vincenzo Santagada, Naples (IT); Beatrice Severino, Mugnano di Napoli (IT); Elisa Magli, Portici (IT)

(73) Assignee: GENETIC S.P.A., Castel San Giorgio (IT)

( * ) Notice: Subject to any disclaimer, the term of this patent is extended or adjusted under 35 U.S.C. 154(b) by 558 days.

(21) Appl. No.: 17/906,997

(22) PCT Filed: Mar. 25, 2021

(86) PCT No.: PCT/EP2021/057780
§ 371 (c)(1),
(2) Date: Sep. 22, 2022

(87) PCT Pub. No.: WO2021/191366
PCT Pub. Date: Sep. 30, 2021

(65) Prior Publication Data
US 2023/0115869 A1    Apr. 13, 2023

(30) Foreign Application Priority Data

Mar. 27, 2020 (IT) .................. 102020000006442

(51) Int. Cl.
| | | |
|---|---|---|
| *A61K 31/665* | (2006.01) | |
| *A61K 31/167* | (2006.01) | |
| *A61P 11/06* | (2006.01) | |
| *A61P 11/08* | (2006.01) | |
| *C07C 231/12* | (2006.01) | |
| *C07C 233/25* | (2006.01) | |
| *C07J 71/00* | (2006.01) | |

(52) U.S. Cl.
CPC .......... *A61K 31/665* (2013.01); *A61K 31/167* (2013.01); *A61P 11/06* (2018.01); *A61P 11/08* (2018.01); *C07C 231/12* (2013.01); *C07C 233/25* (2013.01); *C07J 71/0026* (2013.01); *C07B 2200/13* (2013.01)

(58) Field of Classification Search
CPC ..... A61K 31/665; A61K 31/167; A61P 11/06; A61P 11/08; C07C 231/12; C07C 233/25; C07J 71/0026; C07B 2200/13
See application file for complete search history.

(56) References Cited

U.S. PATENT DOCUMENTS 10,550,190 B2 *   2/2020   Garbaccio ............. C07H 19/10

FOREIGN PATENT DOCUMENTS

| EP | 2774622 | 9/2014 |
|---|---|---|
| WO | WO 98/15280 | 4/1998 |
| WO | WO1999864814 | 12/1999 |
| WO | WO2015153401 | 10/2015 |
| WO | WO 2017/062271 | 4/2017 |
| WO | WO2019136487 | 7/2019 |

OTHER PUBLICATIONS

Gupta, et al., Salts of Therapeutic Agents: Chemical, Physicochemical, and Biological Considerations, Molecules. 2018, 23, 1719.
Kümmerer, Annu. Rev. Environ. Resour., 2010, 35, 57-75,.
Rodriguez-Spong, et al., Advanced Drug Delivery Reviews, 2004, 56, 241-274.
Sarma, et al., Korean J. Chem. Eng., 2011, 28(2), 315-322.
Alt, Many, S.M., et al., "Solubility of budesonide, hydrocortisone, and prednisolone in ethanol + water mixtures at 298.2 K", J. Chem. Eng. Data, 55, 2018, pp. 578 582.
Barnes, P.J., "Scientific rationale for inhaled combination therapy with long-acting 82-agonists and cortocosteroids", Eur. Respir, J., 19, 2002, pp. 182-191.
Costa, Sorair, K.P., et al., "How important are NK1 receptors for influencing microvascular inflammation and itch in the skin? Studies using Phoneutria nigriventer venom", Vascular Pharmacology, 45, 2806, pp. 209-214.
Hofkens, Wouter, et al. , "Safety of glucocorticoids can be improved by lower yet still effective dosages of liposomal sterois formulations in moring antigen-induced arthritis: comparison of prednisolone with budesonide", International Journal of Pharmaceutics, 416, 2011, pp. 493-498.
International Search Report for PCT/EP2021/857788 dated May 17, 2023.
Kern, Jeffrey, C., et al. , "Novel phosphate modified cathepais B linkers: improving aqueous solubility and enhancing payload scope of ADCs", Bioconjugate Chem., 27, 2616, pp. 2881-2888.
Mak, J.C., et al., "Protective effects of corticoid on downregulation of pulmonary beta 2-adrenergic receptors in vivo", J. Clin. Invest., 96(1), 1995, pp. 99-188.

(Continued)

*Primary Examiner* — Timothy R Rozof

(74) *Attorney, Agent, or Firm* — HUESCHEN AND SAGE

(57) ABSTRACT

The present invention relates to salts of budesonide 21-phosphate with β2 adrenergic agonists, preferably with formoterol, pharmaceutical compositions containing the same and the use thereof in the treatment of respiratory inflammatory pathologies, obstructive pathologies and allergen-induced airway dysfunctions. The invention further relates to the process for preparing said salts.

20 Claims, 25 Drawing Sheets

(56) References Cited

OTHER PUBLICATIONS

Mak, Judith, C. W., et al., "Increased expression of & protein-coupled receptor kinases in cystic fibrosis lung", Europeamn Journal of Pharmacology, 436, 2082, pp. 165-172.
Santos, Karent, T., et al., "Early postnatal, but not late, expo to chemical ambient pollutant 1,2-naphthoquinone increases susceptibility to pulmonary allergic inflammation at adulthood", Arch Toxicol, Ss, 2014, 1589-1605.
Yshti, Lidia, N., et al., "Characterization of the mechanisms underlying the inflammatory response to *Polistas lanto lanio* (paper wasp) venom in mouse dorsal skis", Toxicon, 53, 2089, pp. 42-52.
Kern, et al., J. Am. Chem. Soc., 2016, 138, 1430-1445.

\* cited by examiner

BUDESONIDE 21-PHOSPHATE SALTS AND PHARMACEUTICAL COMPOSITIONS CONTAINING THE SAME

The present invention relates to salts of budesonide 21-phosphate with β2 adrenergic agonists, preferably with formoterol, pharmaceutical compositions containing the same and the use thereof in the treatment of respiratory inflammatory pathologies, obstructive pathologies and allergen-induced airway dysfunctions. The invention further relates to the process for preparing said salts.

BACKGROUND OF THE INVENTION

Budesonide (Bud) (chemical name 11β,21-dihydroxy-16α,17α-(butylidenebis(oxy))pregna-1,4-diene-3.20-dione), is a glucocorticoid steroid for the treatment of asthma, chronic obstructive pulmonary disease (COPD), noninfectious rhinitis and Crohn disease, represented by Formula I.

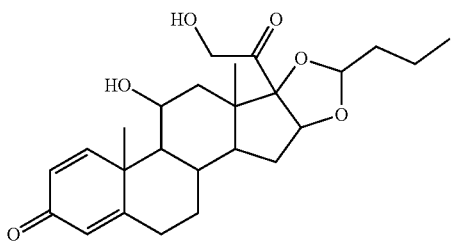

FORMULA I

Budesonide has a log P of 3.2 and results practically insoluble in water (28 µg/mL) [1] at physiological pH in the intestinal region. It belongs to inhaled corticosteroids (ICS), a class of compounds that represents, by far, the most effective therapeutic tool used in the treatment of asthma, able to suppress and activate many genes relevant to elicit inflammation in asthmatic airways, even in very low doses.

β2 (beta2) adrenergic receptor agonists are a class of drugs that act on the β2 adrenergic receptor. β2 adrenergic agonists cause smooth muscle dilation of bronchial tissues, vasodilation in muscle and liver, relaxation of uterine muscle, and release of insulin. They are primarily used to treat asthma and other pulmonary disorders, such as COPD.

They can be divided into short-acting, long-acting, and ultra-long-acting β2 adrenoreceptor agonists.

ICS are commonly administered in combination with long-acting β2-agonists (LABA). Budesonide is usually associated to Formoterol (chemical name N-[2-hydroxy-5-[1-hydroxy-2-[[2-(p-methoxyphenyl)-2-propyl]-amino]-ethyl]-phenyl]-formamide) represented by Formula II.

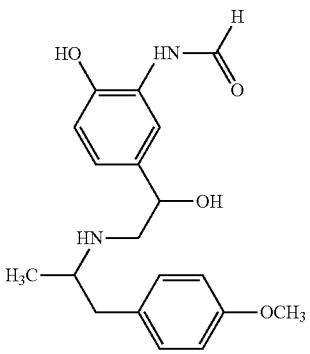

FORMULA II

Inhaled β2-agonists and corticosteroids, frequently used in combination in the control of asthma, show important molecular interactions [2]. In particular, corticosteroids increase the gene transcription of β2-receptors, protecting against their down-regulation after long-term administration [3]. Moreover, corticosteroids may also enhance β2-agonist effects improving the coupling of β2-receptors to G-proteins [4]. These effects further sustain the therapeutic advantage of a combination of these two classes of drugs.

International Journal of Pharmaceutics 416 (2011). pages 493-498 discloses the effects of liposomal and free glucocorticoid formulations on joint inflammation and activity of the hypothalamic-pituitary-adrenal (HPA) axis during experimental antigen-induced arthritis (AIA). Liposomal delivery improves the safety of glucocorticoids by allowing for lower effective dosing. The safety of liposomal glucocorticoid may be further improved by encapsulating budesonide phosphate rather than prednisolone phosphate.

WO 99/64014 discloses the use of a composition comprising formoterol and budesonide for the prevention or treatment of an acute condition of asthma.

Definitions

Unless otherwise defined, all terms of art, notations and other scientific terminology used herein are intended to have the meanings commonly understood by those of skill in the art to which this disclosure pertains. In some cases, terms with commonly understood meanings are defined herein for clarity and/or for ready reference; thus, the inclusion of such definitions herein should not be construed to represent a substantial difference over what is generally understood in the art.

The term "physiologically acceptable excipient" herein refers to a substance devoid of any pharmacological effect of its own and which does not produce adverse reactions when administered to a mammal, preferably a human. Physiologically acceptable excipients are well known in the art and are disclosed, for instance in the Handbook of Pharmaceutical Excipients, sixth edition 2009, herein incorporated by reference.

The terms "Short-acting β2 adrenergic receptor agonists" or "Short-acting β2 agonists" or "SABAs" herein refer to β2 adrenergic receptor agonists having a duration of action of approximately 4 to 6 hours. Preferred examples of SABAs that may be used in the present invention are Fenoterol, Orciprenaline, Salbutamol and Terbutaline.

The terms "Long-acting β2 adrenergic receptor agonists" or "Long-acting β2 agonists" or "LABAs" herein refer to β2 adrenergic receptor agonists having a duration of action up to 12 hours. Preferred examples of LABAs that may be used in the present invention are Bambuterol, Clenbuterol, Formoterol and Salmeterol.

The terms "Ultra-long-acting β2 adrenergic receptor agonists" or "Ultra-long-acting β2 agonists" or "Ultra-LABAs" herein refer to β2 adrenergic receptor agonists having a duration of 24 hours, allowing for once-daily dosing. Preferred examples of Ultra-LABAs that may be used in the present invention are Indacaterol and Olodaterol.

The term "Formoterol" herein refers to Formoterol free base.

The terms "approximately" and "about" herein refer to the range of the experimental error, which may occur in a measurement.

The terms "comprising", "having", "including" and "containing" are to be construed open-ended terms (i.e. meaning "including, but not limited to") and are to be considered as providing support also for terms as "consist essentially of", "consisting essentially of", "consist of" or "consisting of".

The terms "consist essentially of", "consisting essentially of" are to be construed as semi-closed terms, meaning that no other ingredients which materially affects the basic and novel characteristics of the invention are included (optional excipients may thus be included).

The terms "consists of", "consisting of" are to be construed as closed terms.

SUMMARY OF THE INVENTION

Budesonide is virtually insoluble in water while it results readily soluble in alcohols. For this reason, hydroalcoholic solutions are usually prepared dissolving an adequate amount of active substance in solubilizers such as water-soluble alcohols. However, the so prepared solutions have low stability because large amounts of budesonide are decomposed within a short time. Moreover, budesonide formulations have been prepared until now in the form of aqueous suspensions in which the solid phase tends in time to deposit onto the bottom of the container, thus requiring chemical additives or vigorous stirring. These are the reasons that make budesonide not suitable to be delivered by an electric nebulizer.

The 21-phosphate primary esters of several corticosteroids have been prepared and largely used as active ingredients for several pharmaceutical compositions. These molecules have valuable properties not possessed by the parent steroid: first, they are water soluble thus allowing the administration in aqueous solution.

Budesonide 21-phosphate (hereinafter also referred to as Bud-21 P or B) (Formula III) has been used in some studies [5-8] where it is described as linker for targeted delivery of antibody-drug conjugates.

FORMULA III

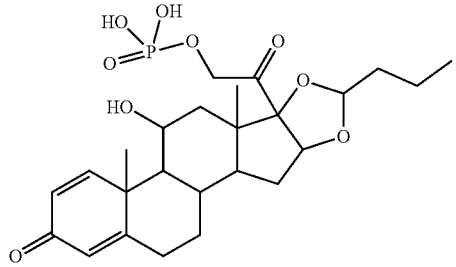

In the present invention compounds of Formula III is described as a more water-soluble compound with anti-inflammatory and anti-asthmatic properties.

Recently, a wide number of medicines approved for the treatment of inflammatory airway diseases is characterized by the combination of molecules such as Beclometasone/Formoterol, Fluticasone furoate/Vilanterol, Budesonide/Formoterol, Indacaterol/Glycopyrronium with different mechanisms of action, aiming to a synergistic therapeutic effect.

The aim of the present invention is to provide novel budesonide 21-phosphate salts having a synergistic therapeutic effect.

According to a first aspect, the present invention relates to the salts of budesonide 21-phosphate with β2 adrenergic agonists.

The present inventors have surprisingly found that the salts of the present invention show a synergic effect in the control of allergen-induced airway dysfunctions.

A second aspect of the present invention is a process for the preparation of the budesonide 21-phosphate salts.

A third aspect of the present invention are pharmaceutical compositions comprising the budesonide 21-phosphate salts in combination with at least one physiologically acceptable excipient.

A fourth aspect of the present invention are the above budesonide 21-phosphate salts and pharmaceutical compositions for use as medicaments.

A fifth aspect of the present invention is the budesonide 21-phosphate or its pharmaceutical compositions with at least one physiologically acceptable excipient for use as anti-inflammatory agent or as anti-asthmatic agent.

A sixth aspect of the present invention are the above budesonide 21-phosphate salts, budesonide 21-phosphate and pharmaceutical compositions thereof for use in treating respiratory inflammatory pathologies, obstructive pathologies, allergen-induced airway dysfunctions.

DESCRIPTION OF THE FIGURES

FIGS. 12A, 128 and 12C show the effects of FB, F and B on total and differential leukocytes counts in BAL fluid from mice with OVA-induced allergic asthma. BAL fluids were collected from untreated sham and OVA-induced allergic animals. FB, F or B were daily administered during 2 weeks time frame and always administered 60 min before the OVA challenges (twice a week). Each bar represents mean t SEM for n=6 animals/group, except for Sham group (n=5). Panel A: Total BAL leukocytes; panel B: BAL eosinophils; panel C: BAL neutrophils; panel D: BAL macrophages; panel E: BAL lymphocytes. *P<0.05, P<0.01 and *P<0.001 vs. Sham; ##P<0.01 and ##P<0.001 vs. untreated OVA group. Data are analyzed by one-way ANOVA followed by the Dunnett test;

FIGS. 14A, 148 and 14C. Comparative effects of budesonide (Bud) and its 21-phospate (Bud-21 P) on bronchoconstriction in mice with OVA-induced allergic asthma. The enhanced pause response (Penh) was measured after exposure of the unrestrained animals to inhaled metyacholine at increasing concentrations (panels A and B) after the daily administration of the compounds during 4 weeks (following the first OVA-challenge). Each data point represents mean±SEM for n=5-6 animals/group. Panel C: Basal Penh measurement (i.e., no methacholine exposure); panel E: areas under the Penh vs. MCh dose curves (AUC); panel D: peak Penh responses ($E_{max}$). Data were analysed by one-way ANOVA followed by the Fisher's LSD test for multiple mean comparisons.*P<0.05 vs. Sham; #P<0.05, ##P<0.01 and ###P<0.001 vs. untreated OVA group.

DETAILED DESCRIPTION OF THE INVENTION

Figure 1:
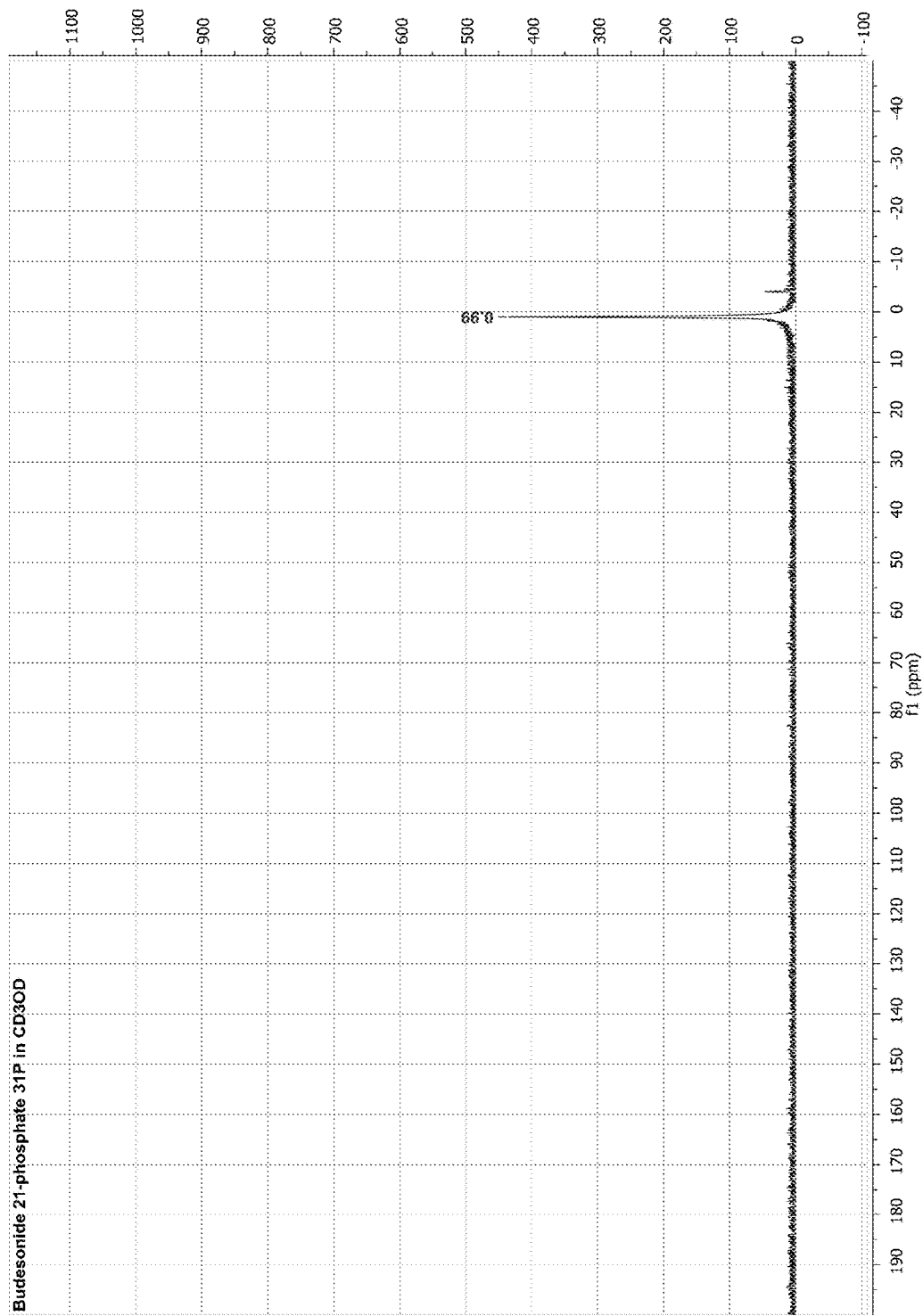
FIG. 1 shows the $^{31}$P NMR of budesonide 21-phosphate in $CD_3OD$-d4.

The present invention relates to a salt of budesonide 21-phosphate with a 02 adrenergic agonist.

In a preferred embodiment of the invention, the 32 adrenergic agonist is selected from short-acting β2 agonists, long-acting β2 agonists or ultra-long-acting β2 agonists.

In another preferred embodiment of the invention, the 12 adrenergic agonist is selected from the group comprising Fenoterol, Orciprenaline, Salbutamol.

Terbutaline, Bambuterol, Clenbuterol, Formoterol, Salmeterol, Indacaterol and Olodaterol.

More preferably, the 02 adrenergic agonist is Formoterol.

Budesonide 21-phosphate formoterol salt (Formula IV) represents a pharmaceutically acceptable salt able to enhance the therapeutic potential, that was designed in order to conjugate better solubility properties with the synergism deriving from the simultaneous presence of two drugs that act by different mechanisms of action.

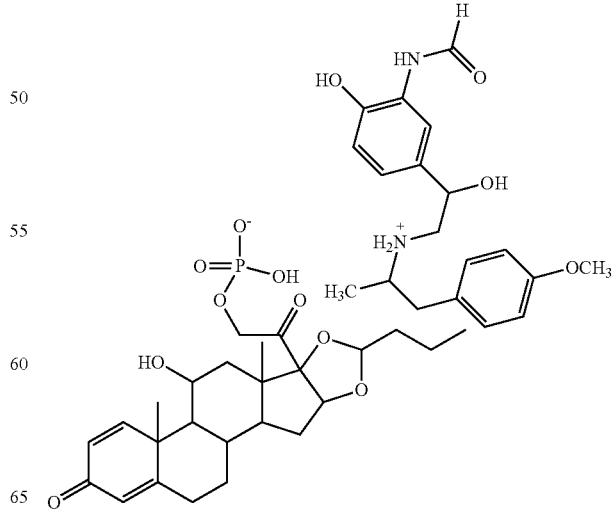

FORMULA IV

The salts can be in solid state and includes all crystalline, polymorphic and pseudo-polymorphic salts.

In an embodiment according to the invention, the budesonide 21-phosphate Formoterol salt in crystalline form IV is characterized by an X-ray powder diffraction pattern, which is obtained by using CuKα radiation and represented by ° 2θ angle, in which there are characteristic peaks at about 5.82, 8.21, 11.67, 13.02, 13.54, 14.17, 14.87, 16.40, 16.92, 18.39, 19.69, 20.15, 20.65, 21.41, 22.28, 23.41, 23.69, 24.16, 24.77, 25.27, 26.41, 27.38, 27.84, 28.58, 30.15, 31.69, 33.58, 34.41, 35.47, 36.02, 37.59, 38.63 2theta ±0.20 degrees.

In an embodiment according to the invention, the budesonide 21-phosphate Formoterol salt in crystalline form IV is characterized by an X-ray powder diffraction pattern, obtained by means of an automatic diffractometer with operative conditions as follows: CuKα radiation, °2θ angle ranging from 4° to 40°, time per step 120 sec equivalent.

Characteristic peaks are listed in Table 1.

TABLE 1

Budesonide 21-phosphate Formoterol salt characteristic peaks.

| No. | Pos. [°2Th.] | Height [cts] | Rel. Int. [%] |
|---|---|---|---|
| 1 | 5.8224 | 513.67 | 13.75 |
| 2 | 8.2103 | 129.42 | 3.46 |
| 3 | 11.6663 | 1353.34 | 36.22 |
| 4 | 13.0214 | 192.3 | 5.15 |
| 5 | 13.5432 | 922.64 | 24.69 |
| 6 | 14.1711 | 1087.24 | 29.1 |
| 7 | 14.8715 | 825.03 | 22.08 |
| 8 | 16.397 | 1777.87 | 47.58 |
| 9 | 16.9223 | 1833.13 | 49.06 |
| 10 | 18.3915 | 1086.21 | 29.07 |
| 11 | 19.6901 | 255.27 | 6.83 |
| 12 | 20.1511 | 708.93 | 18.97 |
| 13 | 20.6502 | 1570 | 42.02 |
| 14 | 21.4143 | 959.77 | 25.69 |
| 15 | 22.276 | 1508.36 | 40.37 |
| 16 | 23.4107 | 1712.06 | 45.82 |
| 17 | 23.6946 | 623.56 | 16.69 |
| 18 | 24.156 | 408.15 | 10.92 |
| 19 | 24.7697 | 722.06 | 19.32 |
| 20 | 25.2716 | 118.27 | 3.16 |
| 21 | 26.413 | 161.65 | 4.33 |
| 22 | 27.3763 | 465.53 | 12.46 |
| 23 | 27.8383 | 97.92 | 2.62 |
| 24 | 28.5821 | 278.21 | 7.45 |
| 25 | 30.1469 | 44.37 | 1.19 |
| 26 | 31.6929 | 3736.69 | 100 |
| 27 | 33.582 | 239.39 | 6.41 |
| 28 | 34.4149 | 63.71 | 1.71 |
| 29 | 35.4679 | 108.48 | 2.9 |
| 30 | 36.0241 | 78.05 | 2.09 |
| 31 | 37.5901 | 114.5 | 3.06 |
| 32 | 38.6313 | 116.91 | 3.13 |

Figure 8:
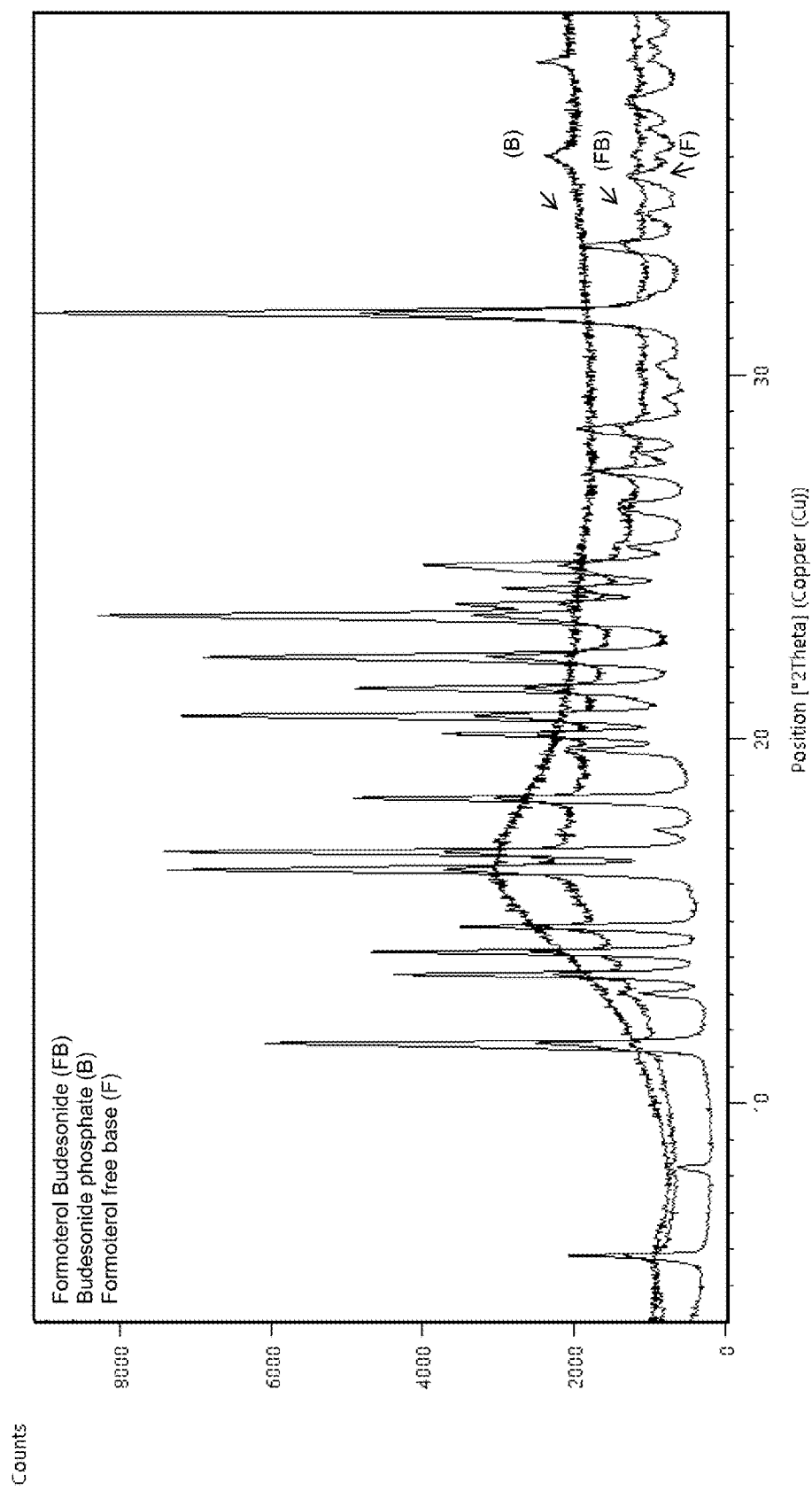
FIG. 8 shows superimposition of X-Ray Powder Diffraction of budesonide 21-phosphate (B), formoterol (F) and budesonide 21-phosphate formoterol salt (FB)

In another embodiment according to the invention, the budesonide 21-phosphate Formoterol salt in crystalline form IV is characterized by an X-ray powder diffraction spectrum as represented in FIG. 8.

As will be shown in the experimental section, budesonide 21-phosphate formoterol salt (FB) has been evaluated performing pre-clinical studies. The study has been conducted by using two models of allergic asthma.

The data obtained by the first set of experiments demonstrated a significant reduction of the bronchial hyperreactivity in the sensitized animals treated with intraperitoneal administration of FB at the dose of 1 mg/Kg.

Thus, FB demonstrated a significant efficacy in preserving airway dysfunction when compared to the parent compounds formoterol (F) or budesonide 21-phosphate (B) at the same dose.

The data obtained by the second set of experiments demonstrated the effects of FB on the bronchoconstriction induced by MCh in allergic mice when administered at doses up to ten times lower than the parent compounds F and B.

Another aspect of this invention relates to a pharmaceutical composition comprising as active ingredient a budesonide 21-phosphate salt with a β2 adrenergic agonist in combination with at least one physiologically acceptable excipient.

Preferably, said compositions are in the form of powder, suspension or solution, more preferably said compositions are administered by inhalation or oral route.

The compositions may be used for inhalation through mucosa or consists in a solution for aerosol therapy. For the administration by inhalation, the compound of the invention may be delivered in the form of an aerosol spray in pressurized packs or by use of nebulisers. Moreover, the formulation may also be delivered as a powder inhaled through the insufflations of inhaler devices. The preferred delivery system for inhalation is a metered dose inhalation aerosol formulated as a suspension or solution of the ingredients in suitable propellants for inhalable pharmaceutical preparations.

The pharmaceutical compositions suitable for oral use can be administered in the form of tablets, capsules or syrups.

Another aspect of the invention relates to the budesonide 21-phosphate salts or their pharmaceutical compositions according to the invention for use as a medicament.

According to a preferred embodiment of the invention, the budesonide 21-phosphate salts or their pharmaceutical compositions are useful in treating respiratory inflammatory pathologies, obstructive pathologies, allergen-induced airway dysfunctions, such as Asthma, COPD and pulmonary fibrosis.

Advantageously, the budesonide 21-phosphate salts of the invention significantly reduce allergen-induced airway dysfunction even if administered at a dose lower than the single drugs.

In particular, considering that the lowest FB dose tested showed significant beneficial effects (both in terms of respiratory function and on the number of circulating leukocytes and cell recruitment to the lungs), comparable or even superior to those of B or F alone, the present inventors suggest that a positive synergism occurs between F and B, when administered as FB, in the control of asthma like features.

Another aspect of the invention relates to a process for the preparation of the budesonide 21-phosphate salts according to the invention, comprising the steps of:
  i) dissolving or suspending budesonide 21-phosphate in an organic solvent;
  ii) adding a β2 adrenergic agonist, preferably Formoterol, under stirring;
  iii) isolating the salt of budesonide 21-phosphate with the β2 adrenergic agonist, preferably the budesonide 21-phosphate formoterol salt.

The useful solvents for salt formation include $C_1$-$C_4$ aliphatic alcohols (methanol, ethanol, isopropanol), $C_2$-$C_5$ aliphatic ketones (acetone, methyl ethyl ketone, methyl isopropyl ketone, diethyl ketone), $C_4$-$C_8$ aliphatic ethers (diethyl ether, diisopropyl ether, ditertbutyl ether), $C_4$-$C_6$ cyclic ethers (tetrahydrofuran, dioxane), $C_3$-$C_6$ aliphatic esters (ethyl acetate), $C_5$-$C_8$ hydrocarbons (toluene, xylene, pentane, hexane, heptane), $C_1$-$C_4$ chlorinated hydrocarbons (dichloromethane, chloroform, dichloroethane), aliphatic $C_2$-$C_4$ nitriles (acetonitrile) or mixtures thereof.

The preferred solvents for salt formation are methanol, ethanol, isopropanol, acetonitrile, ethyl acetate or mixtures thereof.

Preferably, in the process according to the invention the mmol/mL ratio between budesonide 21-phosphate and the organic solvent is from 1:20 to 1:40, preferably 1:30.

Preferably, in the process according to the invention the molar ratio between budesonide 21-phosphate and the β2 adrenergic agonist, preferably Formoterol, is from 1:1 to 1:1.5.

According to a preferred embodiment of the process of the invention, the isolation step iii) is carried out by adding an anti-solvent selected from $C_5$-$C_8$ aliphatic straight chain hydrocarbons, preferably hexane, $C_4$-$C_6$ ethers, preferably diethyl ether, or a mixture thereof.

Preferably, the volume ratio of the organic solvent to the anti-solvent is from 2:1 to 1:2, preferably 1:1 volume ratio.

In alterative, the isolation step iii) is carried out by crystallization.

The useful solvents for crystallization are the same reported above for salt formation, preferably n-hexane.

In an embodiment according to the invention, the process further comprises a drying step at a temperature ranging from 30 to 80° C., preferably 40-50° C. Preferably, the drying step is performed in oven.

Another aspect of the invention relates to the budesonide 21-phosphate or its pharmaceutical compositions in combination with at least one physiologically acceptable excipient, for use as anti-inflammatory agent or as anti-asthmatic agent.

Advantageously, the present inventors have found that the compound of Formula III (hereinafter also referred to as B or Bud-21 P) is a more water-soluble derivative of budesonide that exhibits anti-inflammatory and anti-asthmatic properties. 21-phosphate budesonide, at the dose tested, inhibits both bronchial hyperreactivity and reduces plasma IgE levels when systemically administered. On the other hand, when administered intra-nasally exhibits a significant anti-inflammatory effect in the lung.

Moreover, 21-phosphate budesonide is more potent than parent budesonide to exert their beneficial effects in mice with OVA-induced allergic asthma and in cutaneous induced edema.

According to a preferred embodiment of the invention, the budesonide 21-phosphate or its pharmaceutical compositions are useful in treating respiratory inflammatory pathologies, obstructive pathologies, allergen-induced airway dysfunctions, such as asthma, COPD and pulmonary fibrosis.

EXPERIMENTAL SECTION

Materials and Methods a) Chemistry
1. Materials and Methods
All the other commercial products have been purchased from Merck-Sigma Aldrich.

$^1$H (500 MHz) and $^{13}$C (125 MHz) NMR spectra were recorded on an Agilent INOVA spectrometer; chemical shifts were referenced to the residual solvent signal (CD$_3$OD: $\delta_H$=3.31, $\delta_C$=49.0). Homonuclear $^1$H connectivities were determined by COSY experiments. Two and three bond $^1$H-$^{13}$C connectivities were determined by gradient 2D HMBC experiments optimized for a $^{2,3}$J of 8 Hz. X-ray powder diffraction (XRPD) was performed using a Panalytical X'pert PRO diffractometer. Intensity profiles were collected in the 2θ range of 4-40° using Ni-filtered CuKα radiation (λ=1.5406 Å) at 40 kV and 30 mA, with a step size 0.02°, at a scanning time of 120 s/step. The diffraction patterns were processed using the Highscore Plus suite. IR spectra were recorded on Thermo Nicolet 5700 FT-IR spectrometer.

2. Synthesis of Budesonide 21-phosphate (III)

To a stirred solution of budesonide (10 g, 0.023 mol) in anhydrous THF (35 mL) at −40° C. was added diphosphoryl chloride (8.0 mL, 0.058 mol), and the resulting mixture was stirred at −40° C. for 20 min. The reaction was quenched with water and treated with saturated sodium bicarbonate solution until pH~8 keeping the mixture under stirring for an hour at room temperature. The solution was extracted with ethyl acetate; the aqueous phase was made acidic using a 1 N HCl solution and extracted several times with ethyl acetate. The combined organic phases were washed with brine, dried over sodium sulfate, and concentrated to give budesonide 21-phosphate (10.1 g, 86%). M. P. 219-221° C. LRMS (ES) (M+H)$^+$: calcd, 510.5; found, 511.2. 1H NMR (500 MHz, CD$_3$OD) δ 7.45 (d, J=10.1 Hz, 1H), 6.25 (d, J=10.1 Hz, 1H), 6.01 (s, 1H), 5.21 (t, J=4.9 Hz, 0.5H), 5.14 (d, J=7.2 Hz, 0.5H), 5.01-4.83 (m, 2H), 4.77-4.59 (m, 2H), 4.47-4.37 (m, 1H), 2.65 (td, J=13.4, 5.3 Hz, 1H), 2.37 (d, J=9.6 Hz, 1H), 2.28-2.07 (m, 3H), 2.01-1.92 (m, 1H), 1.87-1.79 (m, 1.5H), 1.77–1.67 (m, 1.5H), 1.64-1.56 (m, 3H), 1.54-1.45 (m, 4H), 1.03-0.88 (m, 7H). 13C NMR (126 MHz, CDsOD) δ 206.14, 204.88, 190.12, 175.51, 160.99, 133.16, 129.17, 123.87, 110.73, 106.88, 101.11, 100.26, 85.59, 84.37, 71.71, 58.41, 55.43, 52.57, 48.30, 47.18, 42.53, 39.49, 37.38, 36.76, 35.60, 34.27, 33.68, 32.95, 22.83, 19.68, 19.32, 19.21, 18.93, 15.63, 15.55.

The $^{31}$P NMR of budesonide 21-phosphate (Formula III) is reported in FIG. 1.

Figure 2:
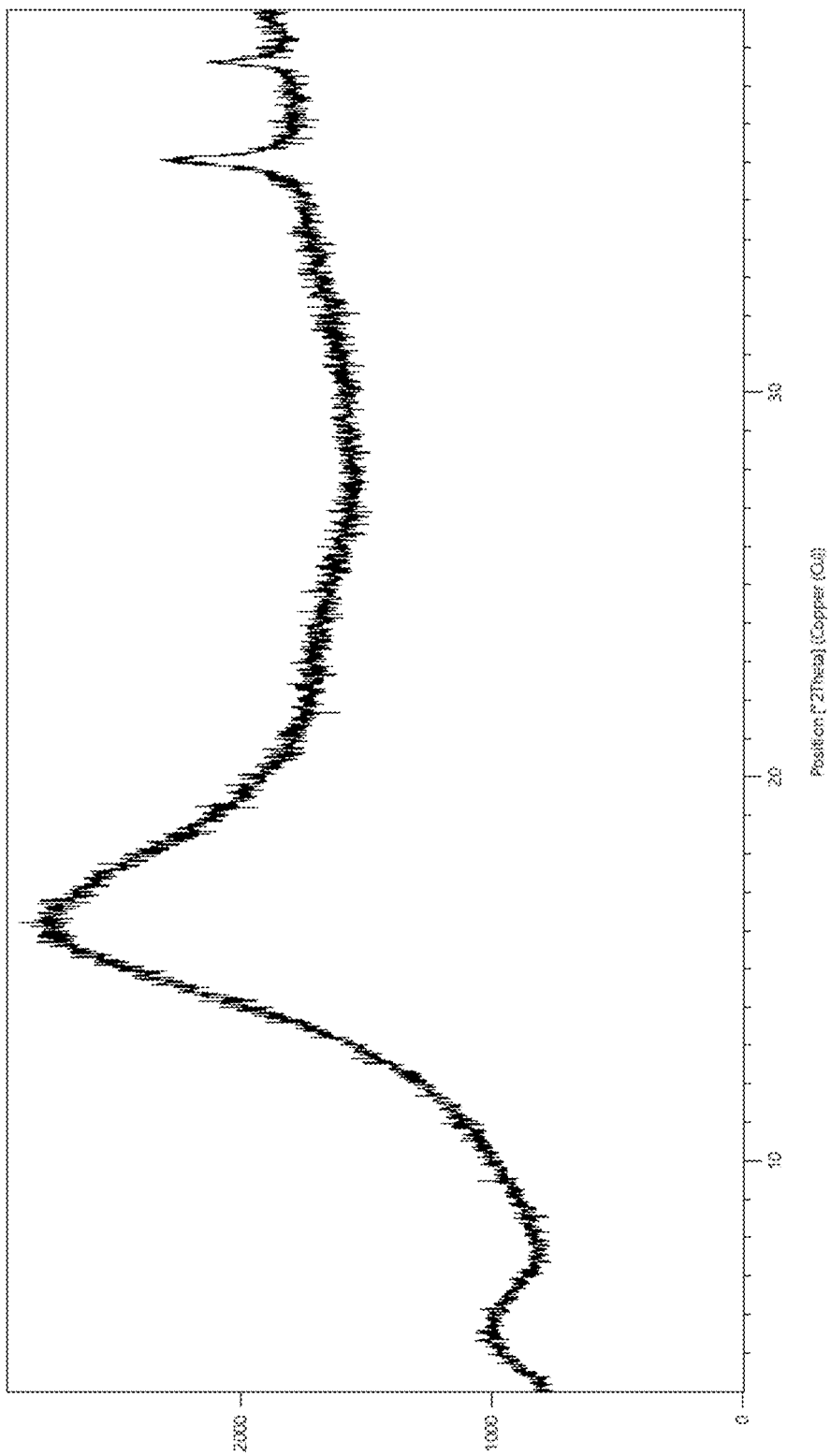
FIG. 2 shows the X-Ray Powder Diffraction of budesonide 21-phosphate.
Figure 3:
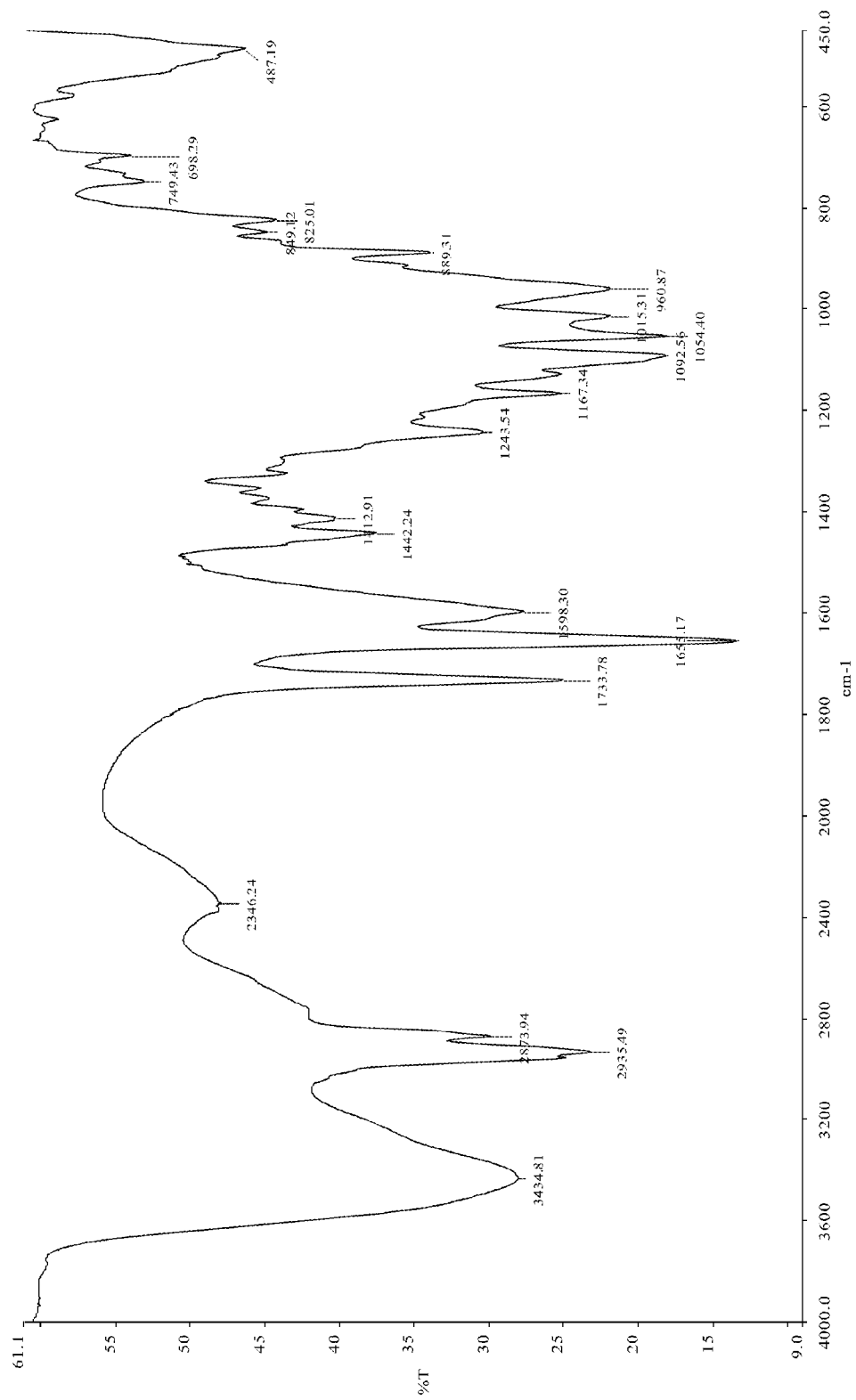
FIG. 3 shows the FT-IR spectrum of budesonide 21-phosphate.

The XRPD analysis is reported in FIG. 2 showing amorphous pattern for the compound. FIG. 3 shows the FT-IR spectrum of budesonide 21-phosphate.

3. Synthesis of Budesonide 21-phosphate Formoterol Salt (IV)
3.1. Example 1

Budesonide 21-phosphate (1 g, 2.0 mmol) was dissolved in 60 mL of ethyl acetate. Formoterol (0.69 g, 2.0 mmol) was added and the solution was vigorously stirred. After an hour, 60 mL of n-hexane were added, and the mixture was further stirred for 12 h. The solid thus formed was filtered off, washed with n-hexane (2×10 mL) and dried in oven (50° C., 12 h). Yield 1.44 g (85%). M. P. 170.0±172.5° C.

$^1$H NMR (CDsOD-d4) δ 8.31 (s, 1H), 8.10 (s, 1H), 7.46 (d, 1H), 7.17 (d, 2H), 7.09 (t, 1H), 6.89 (d, 3H), 6.24 (t, 1H), 6.00 (s, 1H), 5.19 (t, 0.5H), 5.12 (t, 0.5H), 4.97-4.80 (m, 3H), 4.73-4.65 (m, 2H), 4.60 (m, 1H), 4.41-4.39 (m, 1H), 3.77 (s, 3H), 3.57-3.47 (m, 1H), 3.18 (dd, 2H), 2.66 (ddd, 1H), 2.37-2.35 (m, 1H), 2.20-2.09 (m, 3H), 1.93-1.89 (m, 1H), 1.70-1.66 (m, 2H), 1.63-1.56 (m, 4H), 1.48 (s, 3H), 1.23 (d, 3H), 1.00-0.87 (m. 7H).

13C NMR (CD$_3$OD-d4) δ 208.21, 206.87, 190.37, 175.49, 163.31, 161.61, 161.16, 149.80, 134.54, 132.68, 130.55, 129.13, 128.14, 125.07, 123.83, 121.59, 117.42, 116.54, 110.64, 106.74, 101.21, 100.32, 96.72, 85.31, 84.20, 71.80, 71.31, 58.46, 58.30, 56.96, 53.66, 52.60, 48.23, 47.22, 42.79, 42.44, 40.74, 39.54, 39.05, 37.42, 36.78, 36.63, 35.59, 35.08, 34.29, 33.69, 32.98, 22.84, 19.67, 19.30, 19.20, 18.93, 16.83, 15.67, 15.55.

3.2. Example 2

Budesonide 21-phosphate (500 mg) and formoterol (350 mg) were suspended in acetonitrile (30 mL). After 4 hr at the boiling point under vigorous stirring, the mixture was cooled, and the precipitate was recovered by filtration. The powder was washed with acetonitrile. Re-crystallization from diethyl ether gave the desired compound.

Yield 58%.

3.3. Example 3

Budesonide 21-phosphate (500 mg) was dissolved in ethanol (50 mL) and water (25 mL). Formoterol (350 mg) was added and the mixture was kept under intense stirring for 4 hours. Then the solvent was removed by lyophilization and the obtained solid was re-crystallized from n-hexane and dried in oven (50° C., 12 h). Yield 65%.

Figure 4:
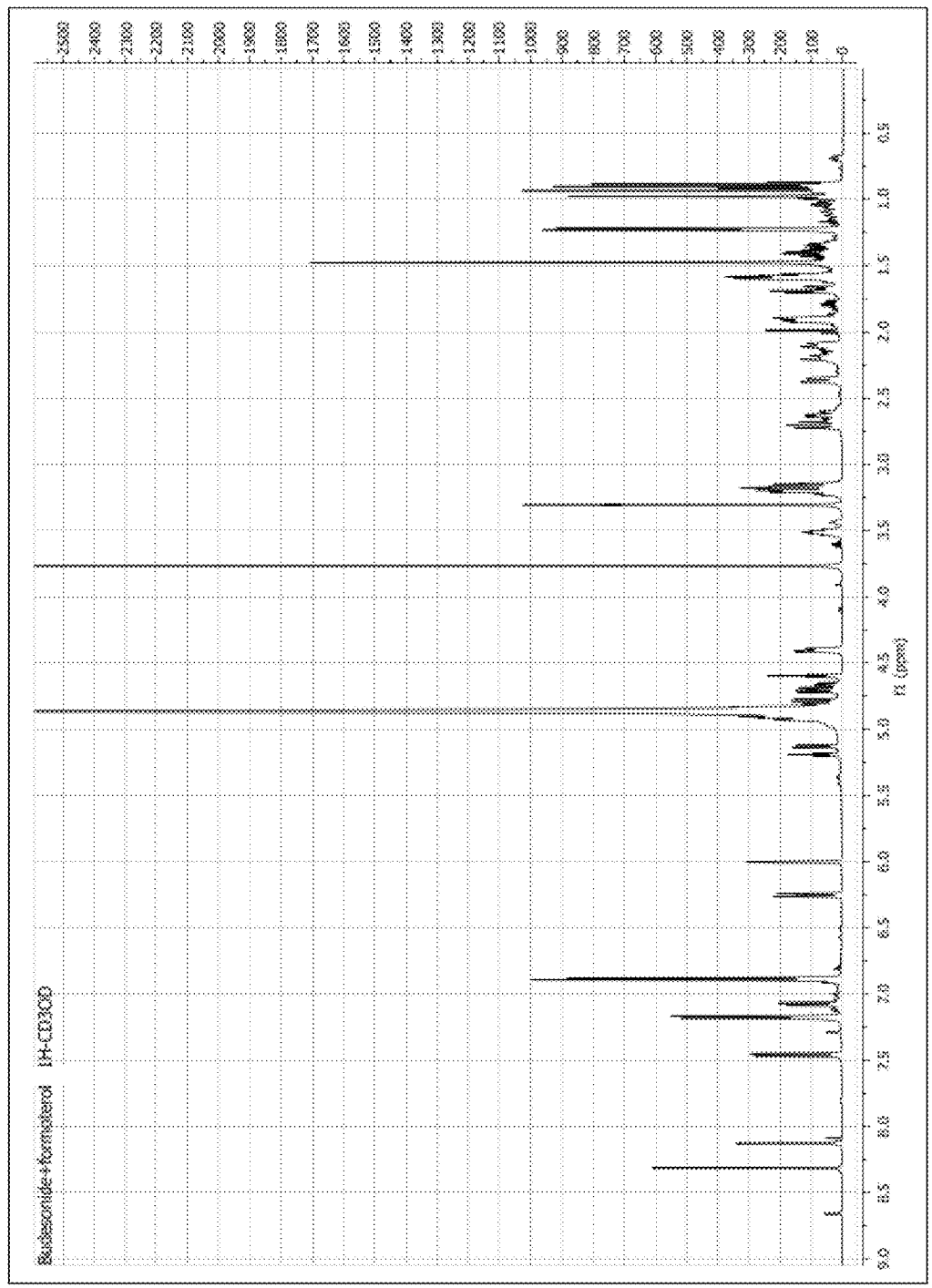
FIG. 4 shows the $^1$H NMR of budesonide 21-phosphate formoterol salt in $CD_3OD$-d4.
Figure 5:
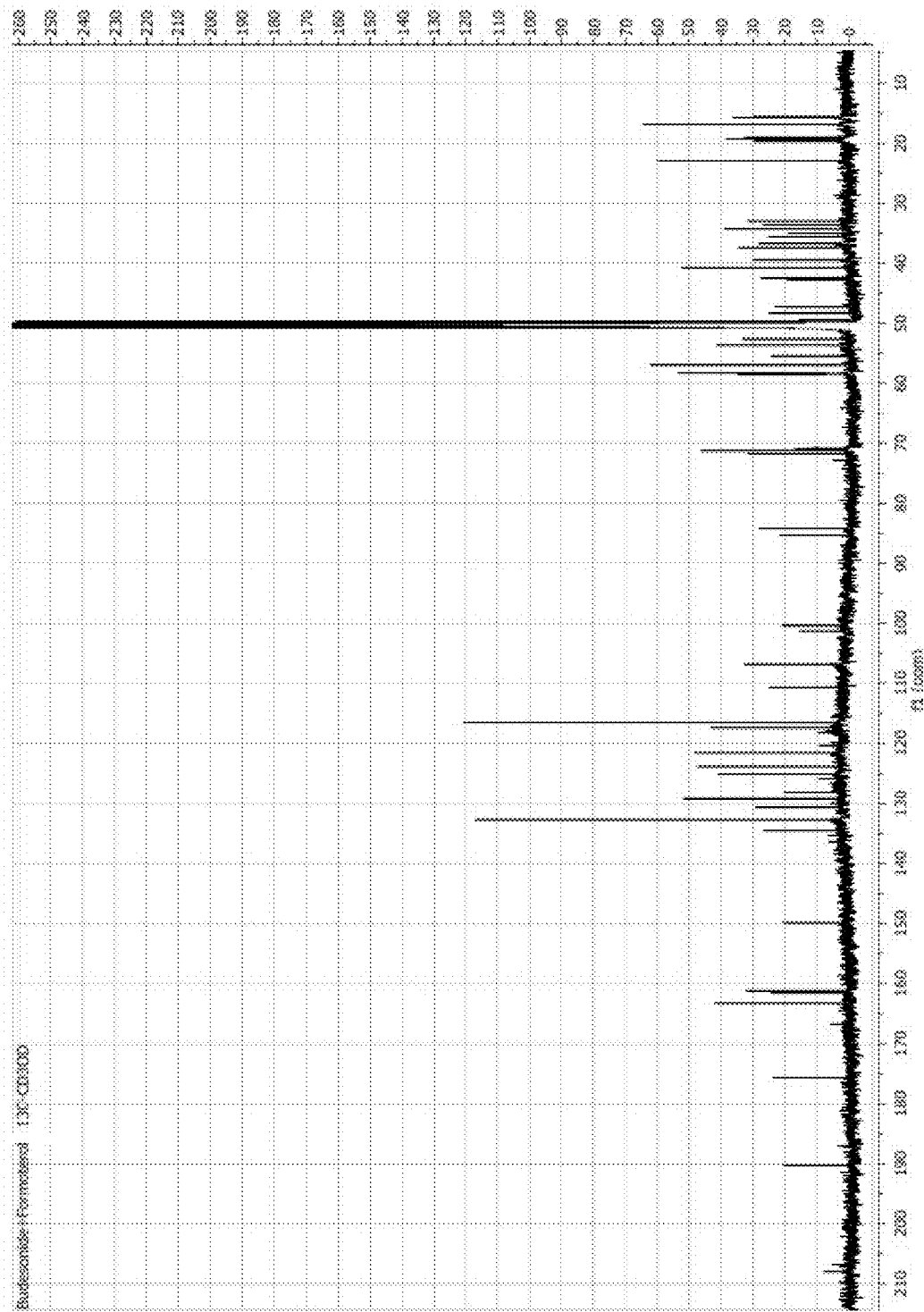
FIG. 5 shows the $^{13}$C NMR of budesonide 21-phosphate formoterol salt in $CD_3OD$-d4.

The salt obtained following the procedure described in Example 1 was further analyzed for specific chemical characterization. In FIGS. 4 and 5, the $^1$H and $^{13}$C NMR spectra of the salt are reported.

Figure 6:
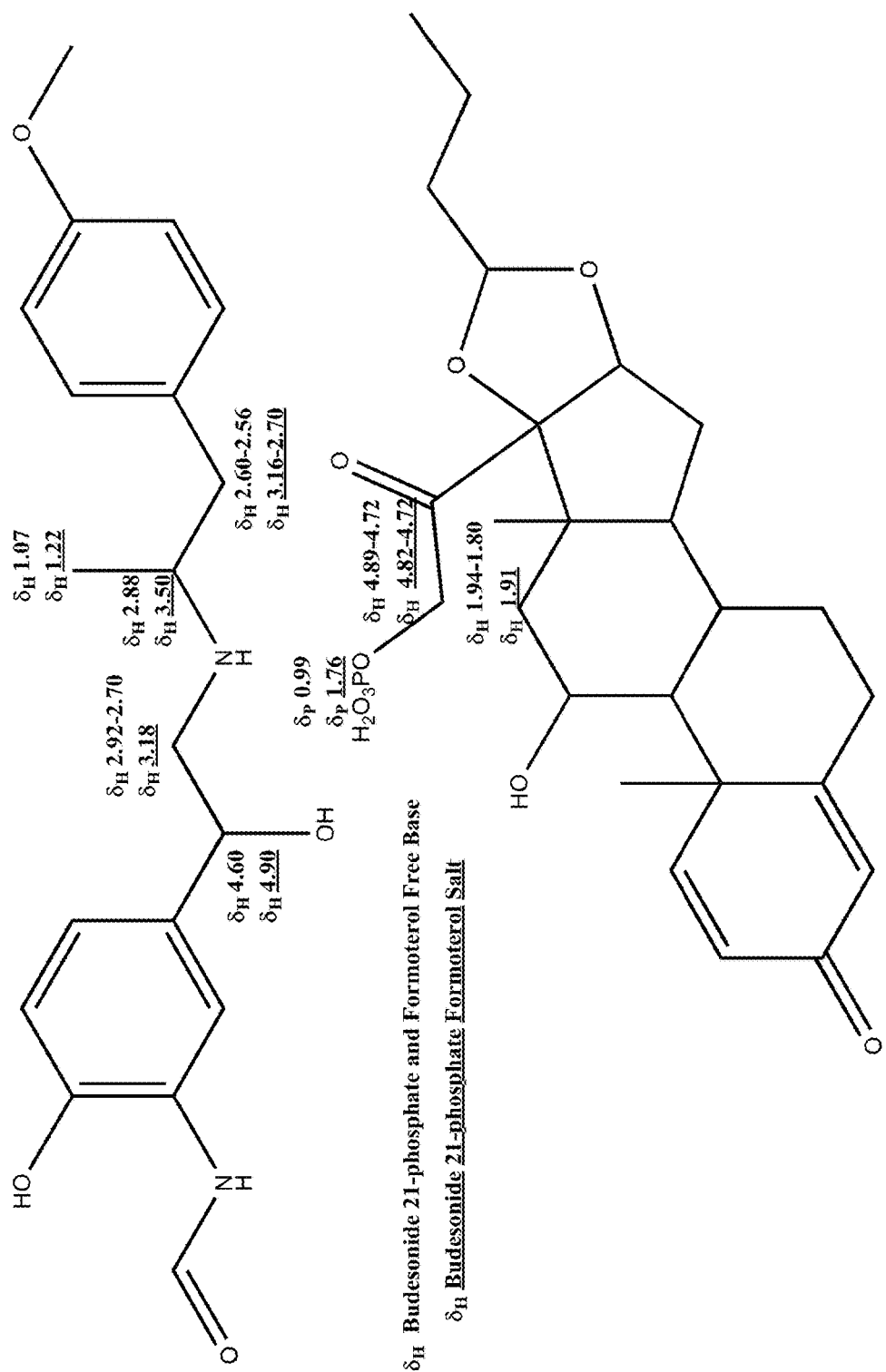
FIG. 6 shows the $^1$H-NMR comparison spectra of budesonide 21-phosphate formoterol salt (underlined data), budesonide 21-phosphate and formoterol (not underlined data)

Moreover, in order to verify the specific interaction between the two constituents, represented by an organic acid and base, mono and two-dimensional NMR analysis were performed. In particular, the $^1$H NMR spectrum of budesonide 21-phosphate formoterol salt showed differences in chemical shift values in comparison to budesonide 21-phosphate and formoterol, previously analyzed. In particular, the most pronounced variations in chemical shift values are those related to protons bound to the carbon atoms in the chemical area near to formoterol secondary amine, as reported in the following FIG. 6.

Less variations have been registered in budesonide 21-phosphate protons chemical shift values. But, in this case is very important the $\delta_P$ shifting (from 0.99 ppm in the free acid to 1.76 ppm in the salt).

Figure 7:
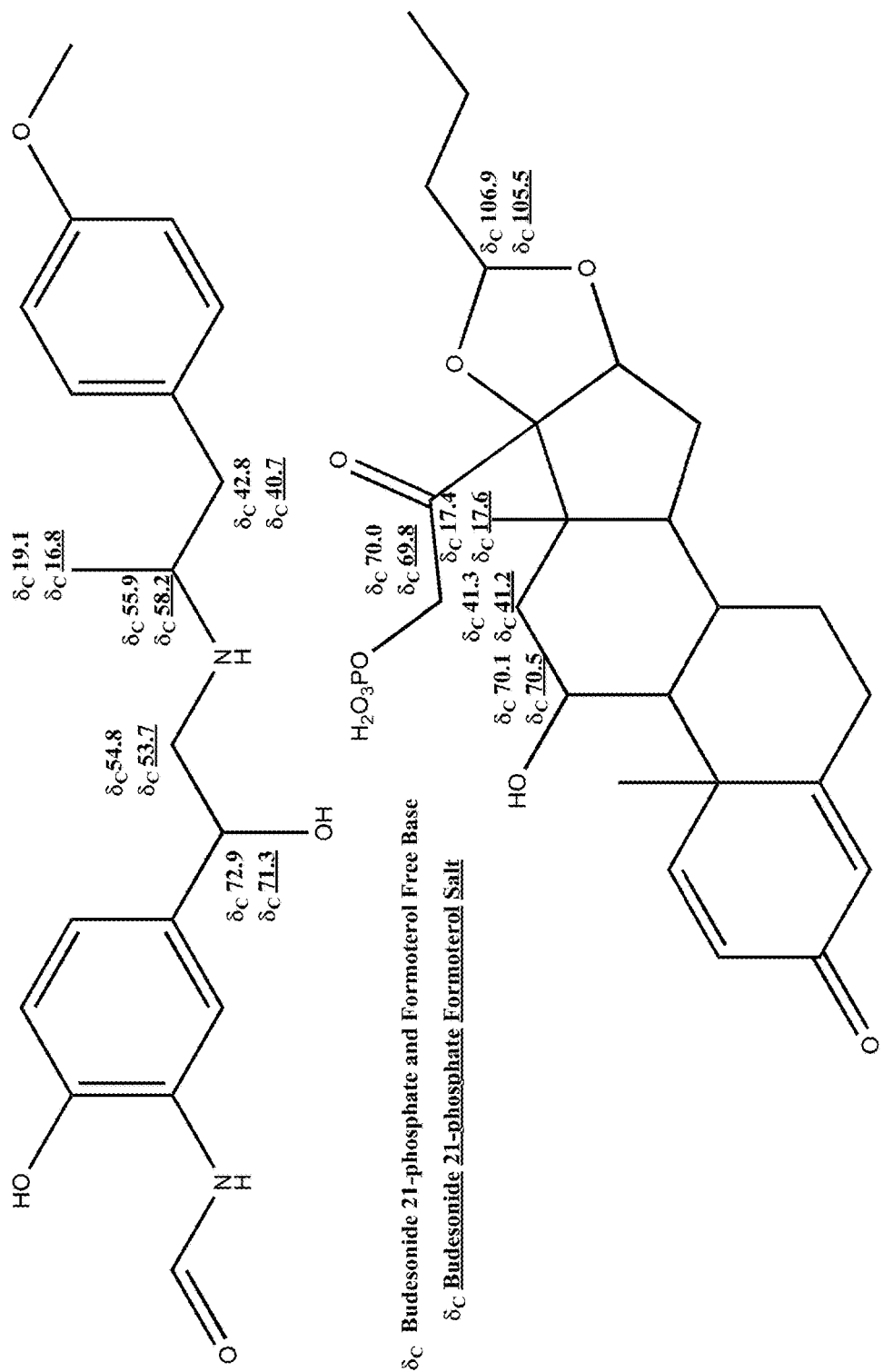
FIG. 7 shows the $^{13}$C-NMR comparison spectra of budesonide 21-phosphate formoterol salt (underlined data), budesonide 21-phosphate and formoterol (not underlined data)

$^{13}$C NMR analysis confirmed the results obtained with $^1$H NMR, highlighting variation of the chemical shifts in the same chemical area when the parent compounds and the salt were compared (FIG. 7).

Figure 9:
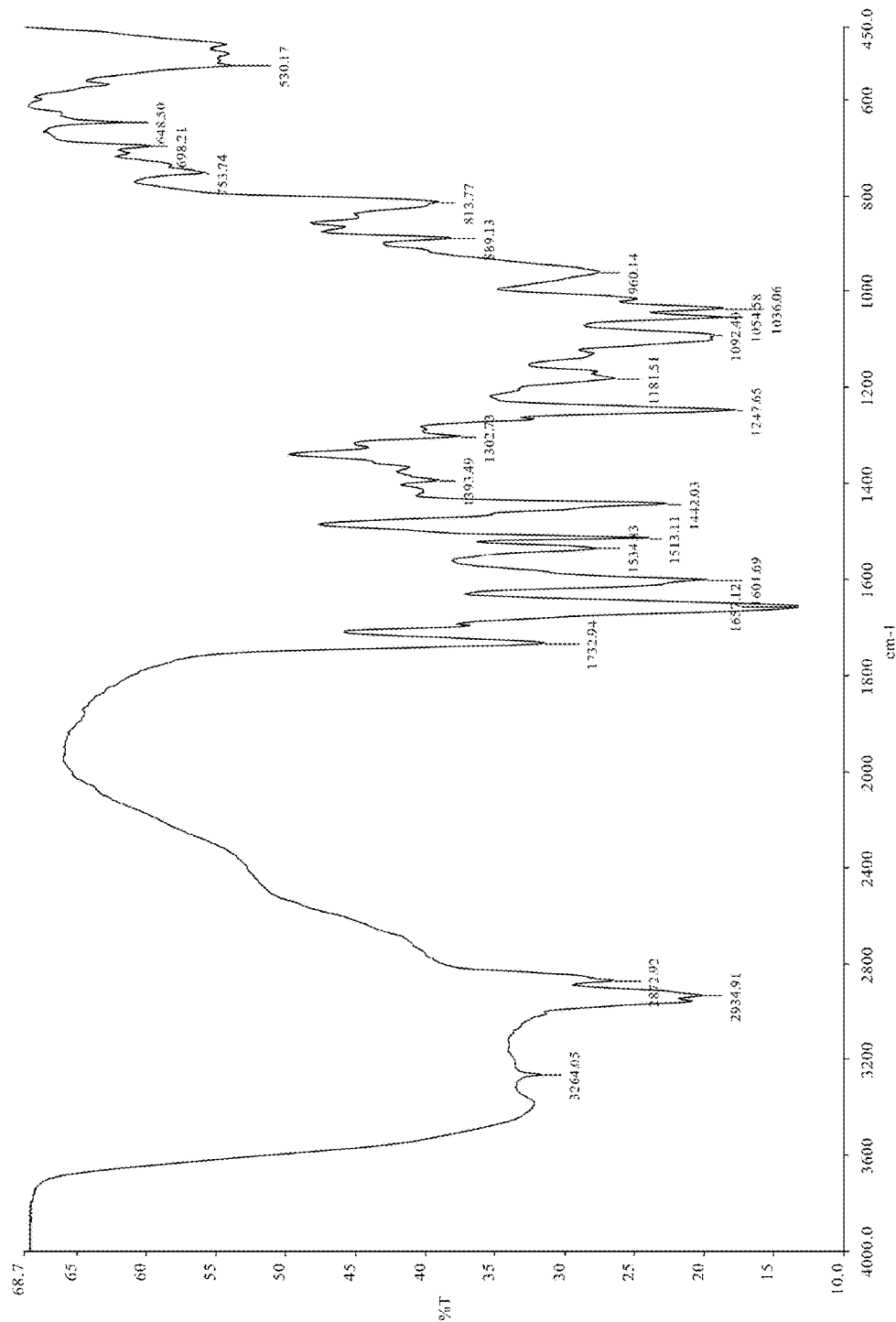
FIG. 9 shows the FT-IR spectrum of budesonide 21-phosphate formoterol salt.

The XRPD analysis of the three compounds budesonide 21-phosphate (red), formoterol (blue) and budesonide 21-phosphate formoterol salt (black) are reported in FIG. 8 while FIG. 9 shows the FT-IR spectrum of budesonide 21-phosphate formoterol salt.

b) Pharmacology

1. Animals 1.1. Protocol-1

Female Balb/c (8-week-old, Charles River, Calco, Italy) were housed in the animal care facility of the Department of Pharmacy of the University of Naples, Italy in a controlled environment (temperature 21±2° C. and humidity 60±10%) and provided with standard rodent chow and water. All animals were allowed to acclimate for four days prior to experiments and were subjected to 12 h light–12 h dark schedule. Experiments were conducted during the light phase. The experimental procedures were approved by the Italian Ministry according to International and National law and policies (EU Directive 2010/63/EU and Italian DL 26/2014 for animal experiments).

1.2. Protocol-2 and 3

Male Balb/c SPF mice (25*2 g, 6-week-old) were purchased from the animal house facilities at the São Paulo School of Medicine (Federal University of São Paulo, Brazil). They were group-housed in a temperature-controlled room at 22° C. with a 12/12-hour light/dark cycle and allowed free access to food and water. The study is in agreement with the Ethical Principles for Animal Research established by the Brazilian College for Animal Experimentation (COBEA). According to the internal laboratory rules, euthanasia is performed if severe distress related to the test agents developed during the experiment.

1.3. Protocol-4

Male C57Bl/6 SPF mice (25±2 g, 6-week-old) were purchased from the animal house facilities at the São Paulo School of Medicine (Federal University of São Paulo, Brazil). They were group-housed in a temperature-controlled room at 22° C. with a 12/12-hour light/dark cycle, had free access to food and water and were allowed to acclimate to our local facility for one week before the start of the experimental procedures. The study agrees with the Ethical Principles for Animal Research established by the Brazilian College for Animal Experimentation (COBEA). According to the internal laboratory rules, euthanasia is performed if severe distress related to the test agents developed during the experiment.

2. Test Substances and Reagents

The test compound budesonide 21-phosphate formoterol salt (FB) and the control compounds budesonide 21-phosphate (B), and formoterol (F) at the dose of 1 mg/Kg were administered intraperitoneally 30 min before each OVA challenge. In another set of experiments FB (at doses of 0.26, 0.85 and 2.56 µg/animal equivalent to 0.3, 1.0 and 3.0 nmol/animal, respectively), B and F (at the respective doses of 1.53 and 1.03 µg/animal, being both equivalent to 3 nmol/animal) were intra-nasally administered. The compounds were dissolved in DMSO (Sigma Chemical Co., St. Louis, MO) at concentrations at which the determined dose per animal results from the intraperitoneal administration of 100 µl of solution (1:10 DMSO) and intra-nasal (i.n.) administration of 10 µl/animal (5 µl/nostril) of the solutions.

In Protocol 3, the test compounds budesonide (Bud; MW: 430.53 g/mol) and budesonide 21-phosphate free acid (Bud-21 P; MW: 510.51 g/mol) were administered at equimolar doses of 3, 10 and 30 nmol/animal/day, equivalent to 1.3, 4.3 and 12.9 µg/animal/day of Bud, 1.5, 5.1 and 15.3 µg/animal/day of Bud-21 P, respectively. The compounds were dissolved in 10% sterile saline+90% DMSO (Sigma Chemical Co., St. Louis, MO) at the correspondent concentrations at which the above mentioned doses per animal result from the intra-nasal (i.n.) administration of 10 µl/animal (5 µl/nostril) of each of the solutions.

Chicken egg-white ovalbumin (OVA; grade V, cat. A5503, Sigma Chemical Co., St. Louis, MO) was dissolved in sterile phosphate buffered saline (PBS) solution (250 µg/ml) and Al(OH)$_3$ was added (at 13 mg/ml). This mix was used to induce the allergic sensitization of the animals by subcutaneous injection. OVA was dissolved at 1% in sterile PBS solution and this solution was nebulized (as the immunological challenges).

In Protocol 4, Bud (at doses of 1.0 and 0.30 mg/kg) and Bud 21-P (at doses of 1.2 and 0.36 mg/kg) were administered on a molar base, these doses were equivalent to 0.70 and 2.32 µmol/kg of each compound, respectively. The vehicle for dissolution of the compounds was sterile saline solution (0.9% NaCl) containing 12.5% DMSO (Sigma Chemical Co., St. Louis, MO). The compound solutions were prepared at concentrations such that the administered dose per kg of body weight results from the intraperitoneal (i.p.) administration of 10 ml/kg of each of the solutions. Bradykinin acetate (BK; cat. B3259, Sigma Chemical Co., St. Louis, MO) and compound 48/80 (C48/80; cat. C2313, Sigma Chemical Co., St. Louis, MO) were respectively dissolved in sterile Tyrode solution at concentrations of 60 µM and 200 µg/ml (in this way, the i.d. injection of 50 µl of each of the agents resulted in doses of 3 nmol and 10 µg per site of injection, respectively).

3. Experimental Groups I

The table below shows the groups for evaluation

| Group | Treatment | Dose | n |
|---|---|---|---|
| Sham | vehicle | 100 µl/animal, i.p. | 6 |
| OVA | vehicle | 100 µl/animal, i.p. | 6 |
| OVA + FB | Budesonide 21-phosphate-Formoterol salt | 1.0 mg/Kg, i.p. | 6 |
| OVA + B | Budesonide 21-phosphate | 1.0 mg/Kg, i.p. | 6 |
| OVA + F | Formoterol | 1.0 mg/Kg, i.p. | 6 |

3.1 Mouse Model of Asthma

Female Balb/c mice (8 weeks; Charles River) were sensitized through subcutaneous administration of Ovalbumin (OVA 100 µg dissolved in 400 µl of Al(OH)$_3$ 13.5 mg/mi) on days 0 and 8, on the twenty-first day the mice were stimulated by aerosolic administration of OVA (3% for twenty minutes). The mice were sacrificed after 48 hours and the bronchi used for the evaluation of bronchial reactivity at carbachol and salbutamol. The drugs were administered intraperitoneally prior to each exposure to the allergen. All compounds were administered at a dose of 1 mg/kg. Plasma levels of IgE were measured as index of sensitization.

3.2 Bronchial Hyperreactivity

Main bronchi were rapidly dissected and cleaned from fat and connective tissue. Rings of 1-2 mm length were cut and mounted in 2.5 ml organ baths containing Krebs solution, at 37° C., oxygenated (95% O$_2$ and 5% CO$_2$), and connected to an isometric force transducer (type 7006, Ugo Basile, Comerio, Italy) associated to a Powerlab 800 (AD Instruments). Rings were initially stretched until a resting tension of 0.5 g and allowed to equilibrate for at least 30 min. In each experiment bronchial rings were previously challenged with acetylcholine (10$^{-6}$ M) until a reproducible response curve was obtained. Subsequently, after tissue washing, a cumulative concentration response curve to carbachol (10$^{-9}$–3×10$^{-6}$ M) was performed. On rings precontracted with carbachol a concentration curve to salbutamol was performed. Results were expressed as dyne per mg tissue.

3.3 Plasma igE Levels

Blood was collected by intracardiac puncture using citrate as anticoagulant. Then plasma was obtained by centrifugation at 800×g at 4° C. for 10 minutes and immediately frozen at −80° C. Total IgE levels were measured by means of ELISA using matched antibody pairs (BD Biosciences Pharmingen San Jose, CA).

4. Experimental Groups II

The table below shows the groups for evaluation:

| Group | Treatment | Dose | n |
|---|---|---|---|
| Sham | vehicle | 10 µl/animal, i.n. | 5 |
| OVA | vehicle | 10 µl/animal, i.n. | 6 |
| OVA + FB0.3 | Budesonide 21-phosphate-Formoterol salt | 0.3 nmol/animal, i.n. | 6 |
| OVA + FB1 | Budesonide 21-phosphate-Formoterol salt | 1.0 nmol/animal, i.n. | 6 |
| OVA + FB3 | Budesonide 21-phosphate-Formoterol salt | 3.0 nmol/animal, i.n. | 6 |
| OVA + F 3 | Formoterol | 3.0 nmol/animal, i.n. | 6 |
| OVA + B3 | Budesonide 21-phosphate | 3.0 nmol/animal, i.n. | 6 |

Experimental Groups III

The table below shows the groups for evaluation:

| Group | Treatment | Dose | n |
|---|---|---|---|
| Sham | DMSO/saline | 10 µl/animal, i.n. | 5 |
| OVA | DMSO/saline | 10 µl/animal, i.n. | 6 |
| OVA + Bud 3 | Budesonide | 3 nmol/animal/day, i.n. | 6 |
| OVA + Bud 10 | Budesonide | 10 nmol/animal/day, i.n. | 6 |
| OVA + Bud 30 | Budesonide | 30 nmol/animal/day, i.n. | 6 |
| OVA + Bud-21 P 3 | Budesonide 21-phosphate | 3 nmol/animal/day, i.n. | 6 |
| OVA + Bud-21 P 10 | Budesonide 21-phosphate | 10 nmol/animal/day, i.n. | 6 |
| OVA + Bud-21 P 30 | Budesonide 21-phosphate | 30 nmol/animal/day, i.n. | 6 |

4.1 Induction of Airway Hyperreactivity and Treatments

Mice were sensitized with two subcutaneous injections of 0.4 ml of OVA/Al(OH)$_3$, with an interval of 7 days (Sham animals received the Al(OH)$_3$ suspension in PBS with no OVA). Seven days after the second sensitization (i.e., 3$^{rd}$ week), the animals were nebulized twice a week with the 1% OVA solution (Sham and untreated OVA groups were nebulized with PBS) during 20 minutes for the next 2 weeks. Sixty minutes before the challenges (OVA nebulization) and daily during the next 4 weeks, mice were intra-nasally treated (10 µl/animal as 5 µl/nostril) with the respective compounds/vehicle.

4.2 Lung Hyperreactivity/Penh Function

Airway responsiveness in conscious, spontaneously breathing animals was measured at the end of the 4$^{th}$ week (i.e., after 2 weeks of OVA challenges+treatments), 24 h after the last OVA/PBS challenge via whole body plethysmography (Buxco Europe Ltd, Winchester, UK), as previously described [9]. Experiments were carried out in a quiet room by an investigator who was unaware of the nature of treatments. Aerosolized saline (50 µl/mouse during 60 s) and then the muscarinic agonist metacholine (MCh) at increasing concentrations (3.12, 6.25, 12.5 and 25.0 mg/ml in PBS) was nebulized through an inlet of the main chamber for 3 min each to induce bronchoconstriction and readings were taken and averaged for 6 min following each nebulization. After 20 min, the baseline values usually returned at the end of this period. Enhanced pause (Penh) was measured as an indicator of bronchoconstriction and consequent increase of airway resistances: Penh=[(expiration time/relaxation time)−1]/(maximum expiration flow/maximum inspiration flow)

4.3 Collection of BAL Fluid and Blood Samples

After Penh evaluation, the mice were anesthetized with inhaled isofluorane (5% v/v in O$_2$) and blood samples were collected from the descending abdominal aorta. The mice were then euthanized by exsanguination (blood samples were collected from each animal for leukocyte cell counting), and bronchoalveolar lavage (BAL) was performed by exposing and cannulating the trachea with a polyethylene tube (1 mm outer diameter) connected to a syringe. The lungs were washed by flushing 300 µL of heparin-containing PBS solution (20 Ul/mL). The retrieved BAL lavage aliquots were obtained, and the same procedure was repeated four additional times. The samples were submitted to centrifugation (1000 g for 10 min) and the cell pellet was resuspended in 200 µL of PBS solution. Total cell counts were determined using a Neubauer chamber, and differential counting was carried out in cytospin (Fanem Mod 2400; São Paulo, Brazil) preparations stained with May-Grünwald dye. Leukocytes were classified based on normal morphological criteria.

5. Experimental Groups IV

The tables below show the experimental groups for evaluation:

Experiment #1

| Treatment | Dose | n |
|---|---|---|
| Vehicle | 10 ml/kg; i.p. | 5 |
| Bud | 1.0 mg/kg; i.p. | 5 |
| Bud 21-P | 1.2 mg/kg; i.p. | 5 |

Experiment #2

| Treatment | Dose | n |
|---|---|---|
| Vehicle | 10 ml/kg; i.p. | 5 |
| Bud | 0.30 mg/kg; i.p. | 5 |
| Bud 21-P | 0.36 mg/kg; i.p. | 5 |

5.1 Induction of Skin Edema and Treatments

Skin edema was assessed in mice according to the method previously described by Costa et al. (2006) [10] and Yshii et al (2009) [11]. The mice were anesthetized with urethane (25% w/v, 10 ml/kg, i.p.), had their dorsal skin shaved, and thereafter i.p. treated with the vehicle/test compounds. Fifty-five minutes later, a volume of 100 µL of Evans blue dye solution (0.25% in sterile saline) was intravenously (i.v.) injected via the tail vein. Five minutes later, the BK and C48/80 were intradermally (i.d.) injected into the dorsal skin at a fixed volume of 50 µl using a randomized scheme. The same volume of Tyrode solution 50 µl was injected as a control. Thirty minutes later, a 1 ml blood sample was obtained via cardiac puncture and the mice were killed by urethane overdose followed by cervical dislocation. The blood samples were centrifuged at 6,000 g for 4 min to obtain the plasma. The dorsal skin was removed, and the injected sites were punched out using an 8 mm diameter cork borer. A non-injected skin site distant from the injection sites was also punched and taken as a blank. The dye was extracted from each piece of skin and plasma (100 µl) samples using formamide, and the absorbance of the resulting solutions was measured at 620 nm. The plasma extravasation due to each agent (expressed in µl/site) was calculated as the ratio between the absorbance of each respective skin piece, corrected by the blank value and plasma sample solutions, properly adjusted by the dilution factors [10]. To homogenate data due to the variability of different group of animals (inter-group variations), edema data are expressed as the fold-change response relative to the mean Tyrode (control) response of each experiment.

6. Statistical Analysis

Data are expressed as arithmetic mean t SEM from n individual animals. Statistical analysis of data was carried out using Software GraphPad Prism v5.01. The results were analysed using one-way ANOVA, followed by the Dunnett's multiple comparison test; differences between group means with $P<0.05$ values were considered as significant.

Results

1. Experimental Groups I

Figure 10:
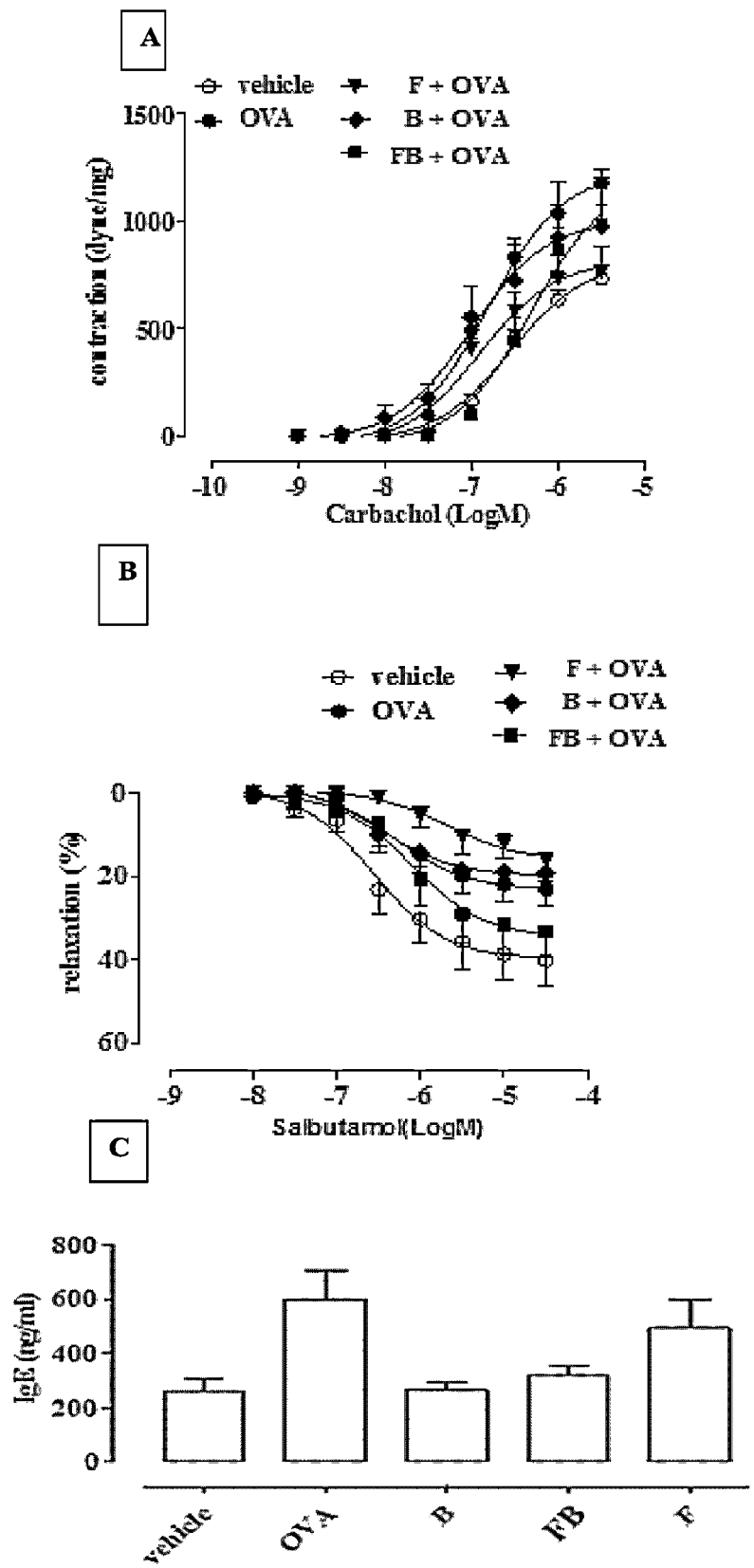
FIG. 10 shows the effects of FB, F and B on bronchial reactivity and plasma IgE levels in OVA-sensitized mice. Each data point represents mean±SEM for n=6 animals/group. Panel A: vehicle vs OVA p<0.001; F vs. OVA **P<0.001; FB vs OVA p<0.001. Panel B: vehicle vs OVA p<0.001; FB vs OVA p<0.001. Data are analyzed by twoway ANOVA followed by the Bonferroni test. Panel C: vehicle vs OVA p<0.01; B vs OVA p<0.01; FB vs OVA p<0.01. Data are analyzed by one-way ANOVA.

OVA-induced sensitization significantly increased bronchial reactivity, as assessed by the increased response of isolate bronchi to carbachol when compared to vehicle group. Significant reduction of the bronchial hyperreactivity was observed in the allergic animals treated with intraperitoneal administration of either F or FB (FIG. 10A). Conversely B at the dose of 1 mg/Kg did not significantly affect the increased response of carbachol (FIG. 10A). OVA nebulization induces also a significant reduction in the bronchial relaxation to salbutamol. Pretreatment with F or B did not ameliorate the lack of bronchial response to salbutamol, while FB significantly increased bronchial relaxation (FIG. 10B). Blood was collected by intracardiac puncture and plasma IgE levels measured. As evident in the panel C both treatment with B and FB significantly reduced OVA induced increase of IgE plasma levels.

2. Experimental Groups II 2.1 Lung Hyperreactivity/Penh Function

Figure 11A:
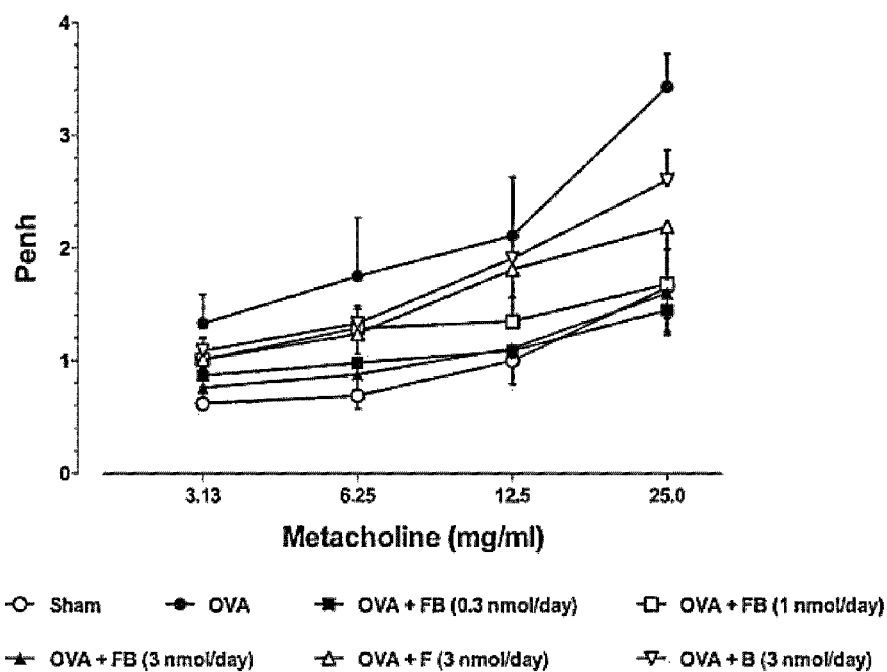
FIGS. 11A and 11B show the effects of FB, F and B on Penh measurements in mice with OVA-induced allergic asthma. Bronchoconstriction was assessed by the enhanced pause response (Penh) measured after exposure of the unrestrained animals to inhaled saline solution (panel B) or to increasing concentrations of inhalatory metacholine (MCh; panel A). FB, F or B were daily administered during 2 weeks time frame always 60 min before the OVA challenges (twice a week). Each data point represents mean±SEM for n=6 animals/group, except for Sham group (n=5). Panel A: MCh dose vs. response curves; panel C: peak Penh responses (Emax); panel D: areas under the Penh vs. MCh dose curves (AUC). **P<0.01 vs. Sham; #P<0.05, ##P<0.01 and ##P<0.001 vs. untreated OVA group. Data are analyzed by one-way ANOVA followed by the Dunnett test.
Figure 11A:
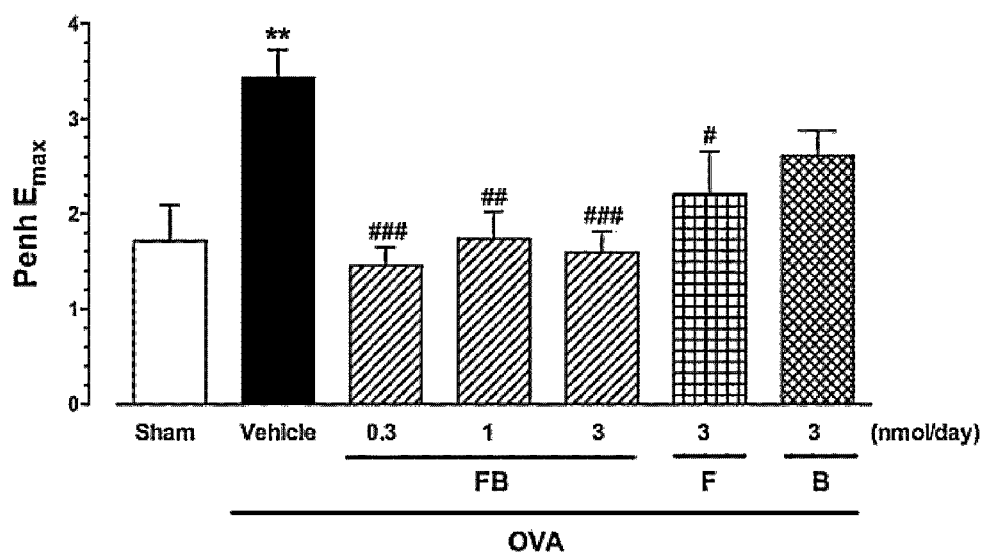
Figure 11B:
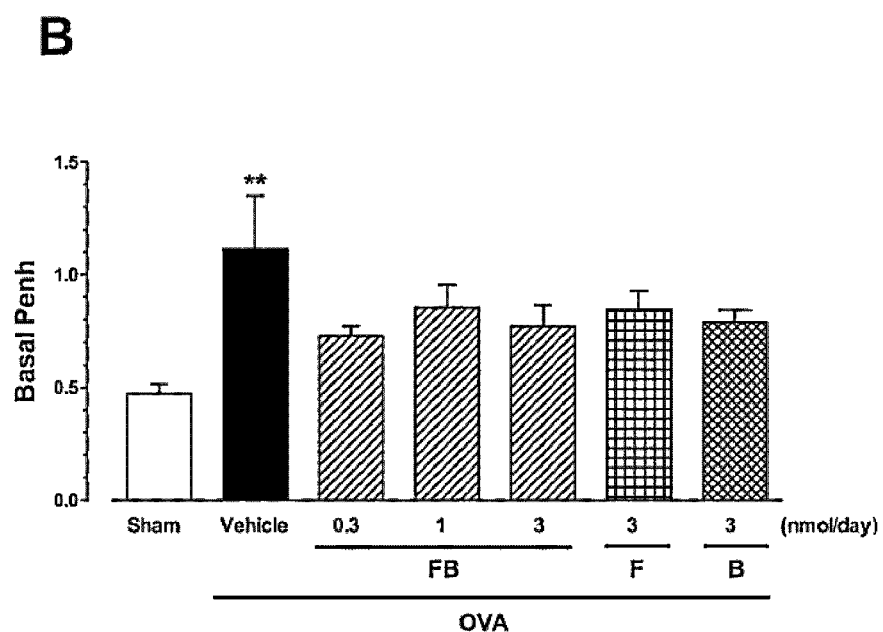
Figure 11B:
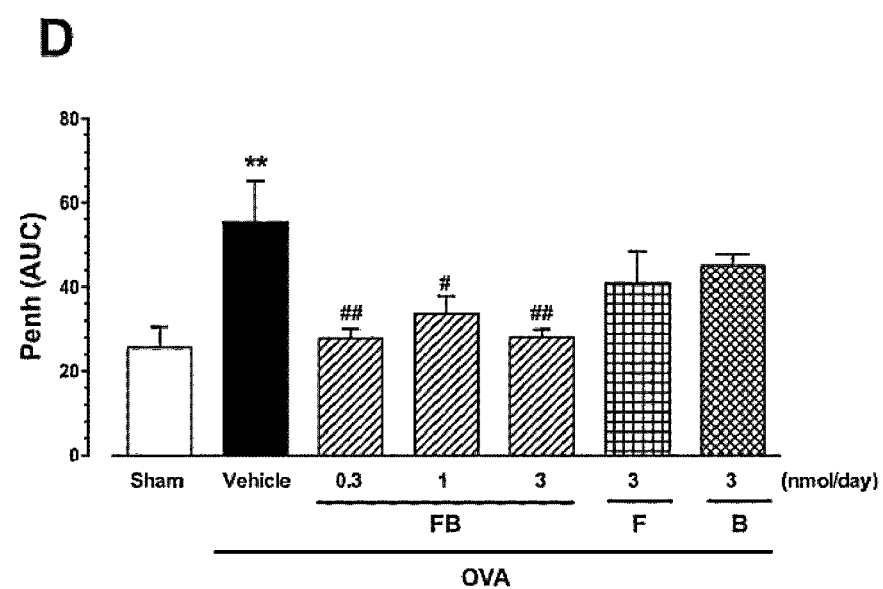

OVA-induced allergy significantly increased airway responsiveness, as assessed by the Penh measurement under basal conditions (inhalation of PBS solution; FIG. 11B, Panel B). None of the treatments resulted in reduction of the basal response. Increasing concentrations of inhaled metacholine (MCh) resulted in a dose-dependent increase of Penh function. In OVA-induced allergic condition this airway responsiveness significantly augmented (FIG. 11A, panel A), as evidenced by: i) the increased maximal response ($E_{max}$; FIG. 11A, panel C); ii) the area under the Penh-metacholine concentration curve (AUC; FIG. 11B, panel D). Significant reduction of the maximal response $E_{max}$ was observed in the allergic animals treated with either F or FB at all the tested doses (FIG. 11A, panel C). Although only the FB compound at all the doses tested significantly reduced Penh at all the MCh doses tested (FIG. 11B, panel D). (i.e., before the MCh challenges preventative protocol).

2.2 BAL Fluid Cell Counts

Figure 12A:
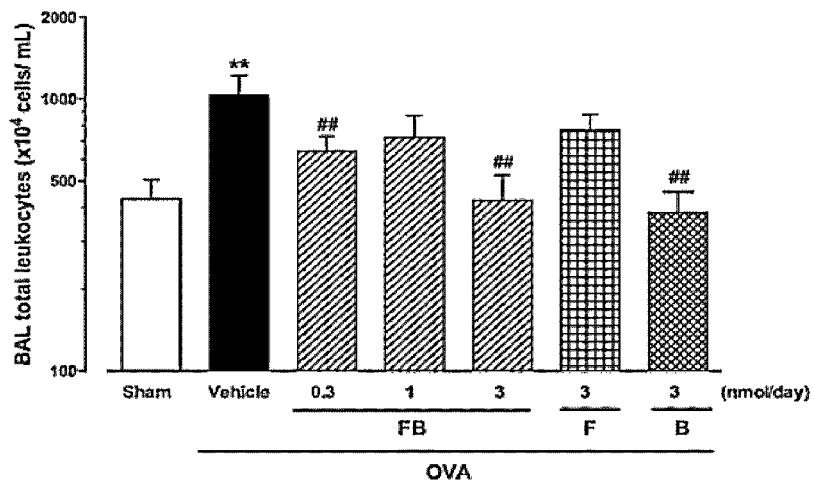
Figure 12A:
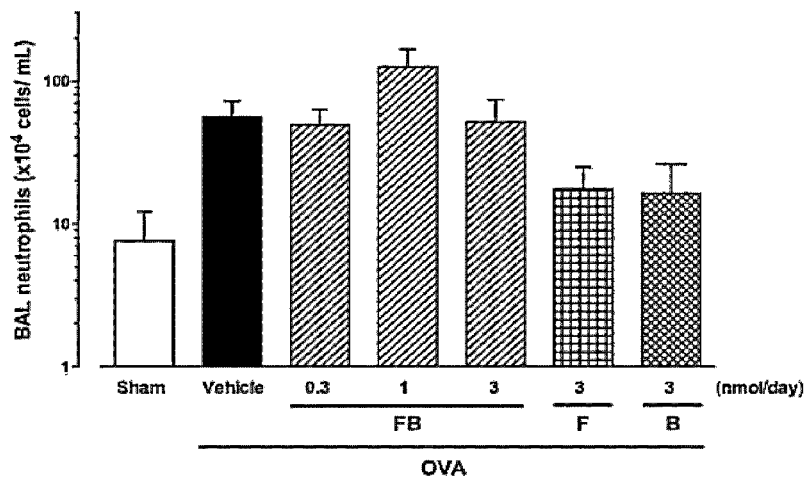
Figure 12B:
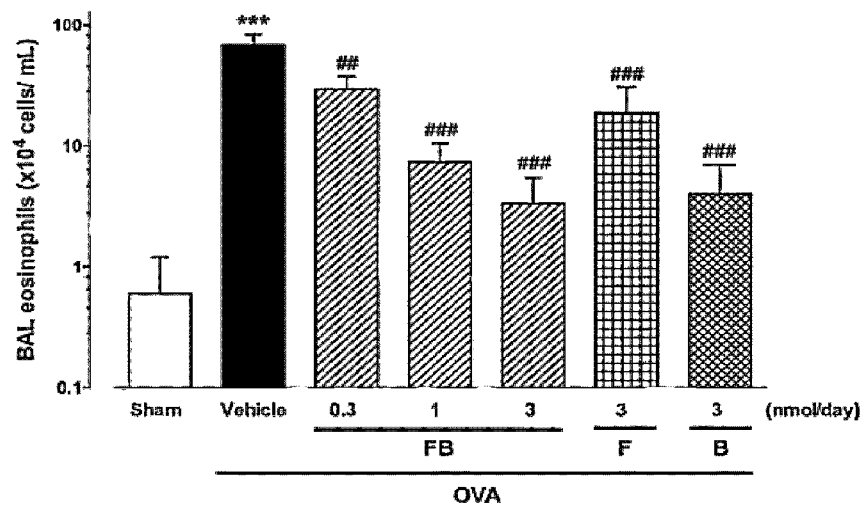
Figure 12B:
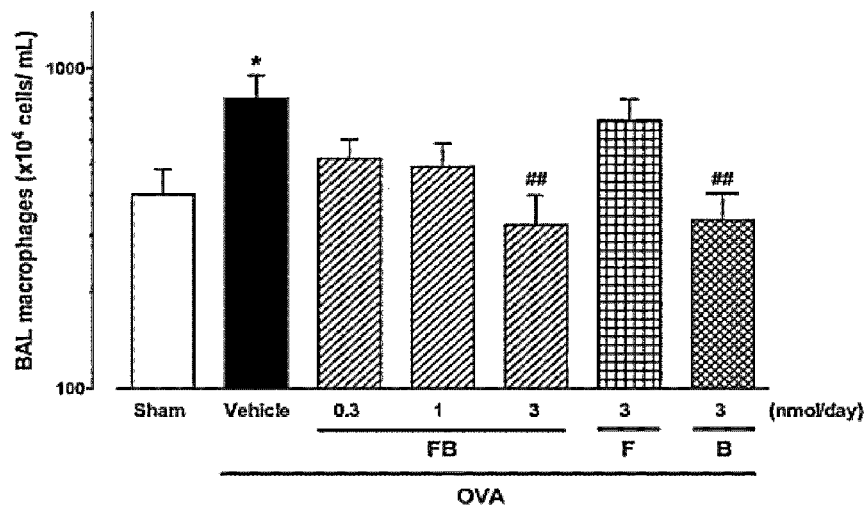
Figure 12C:
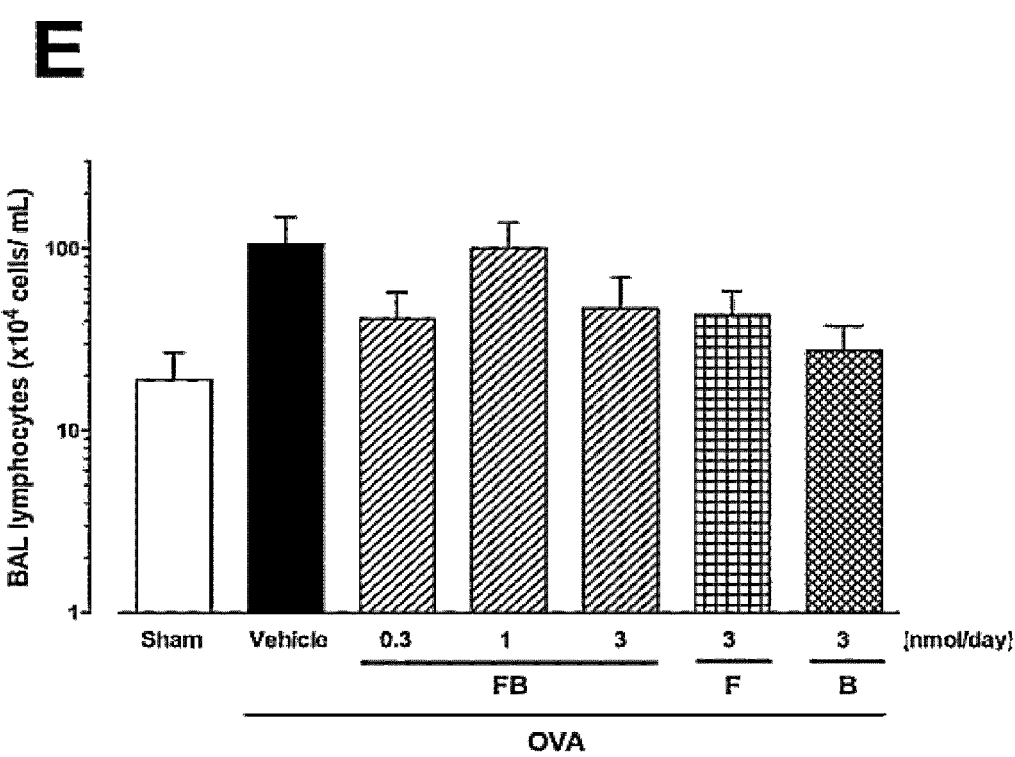

FIGS. 12A, 12B and 12C show that OVA-induced allergy significantly increased the number of total leukocytes in the collected BAL fluids (panel A). This response was significantly reduced in the animals receiving FB (at 0.3 and 3 nmol/animal doses) or B (at 3 nmol/animal). Panel B shows that all the treatments reduced the number of eosinophils in the BAL samples. Treatment with either FB or B (at 3 nmol/animal) abolished the OVA-induced increase of BAL macrophages (panel D). On the other hand, there were no statistically significant differences in terms of both neutrophils and lymphocytes among the experimental groups (Panels C and E, respectively).

2.3 Circulating Leukocyte Cell Counts

Figure 13A:
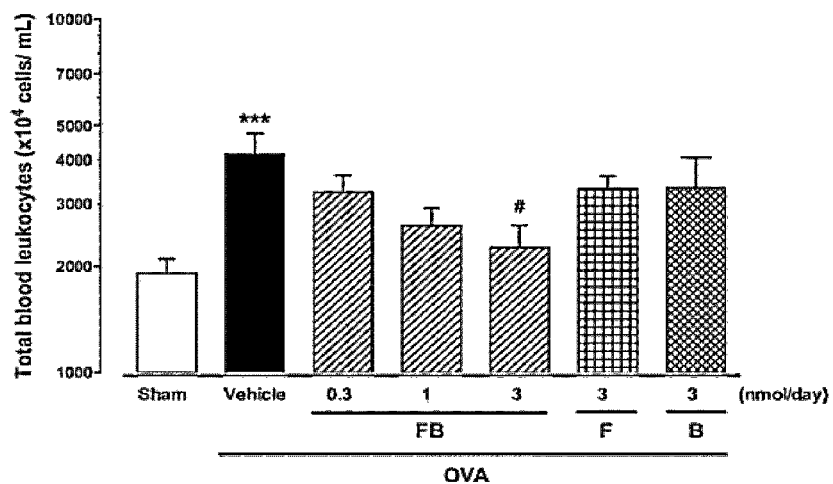
FIGS. 13A, 13B and 13C show the effects of FB, F and B on total and differential circulating leukocyte counts in mice with OVA-Induced allergic asthma. Blood samples were collected from untreated sham and OVA-induced allergic animals. FB, F or B were daily administered during 2 weeks time frame, and administered always 60 min before the OVA challenges (twice a week). Each bar represents mean t SEM for n=6 animals/group, except for Sham group (n=5). Panel A: Total blood leukocytes; panel B: blood eosinophils; panel C: blood neutrophils; panel D: blood macrophages: panel E: blood lymphocytes. P<0.01 and *P<0.001 vs. Sham; #P<0.05, ##P<0.01 and ###P<0.001 vs. untreated OVA group Data are analyzed by one-way ANOVA followed by the Dunnett test.
Figure 13A:
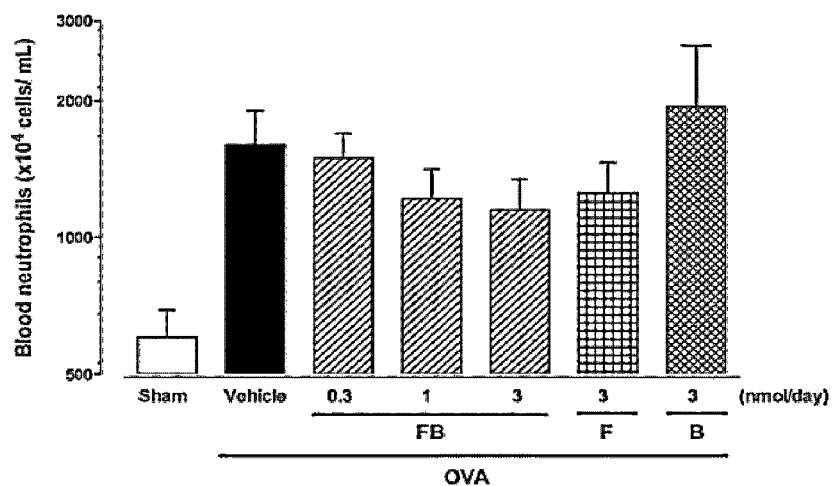
Figure 13B:
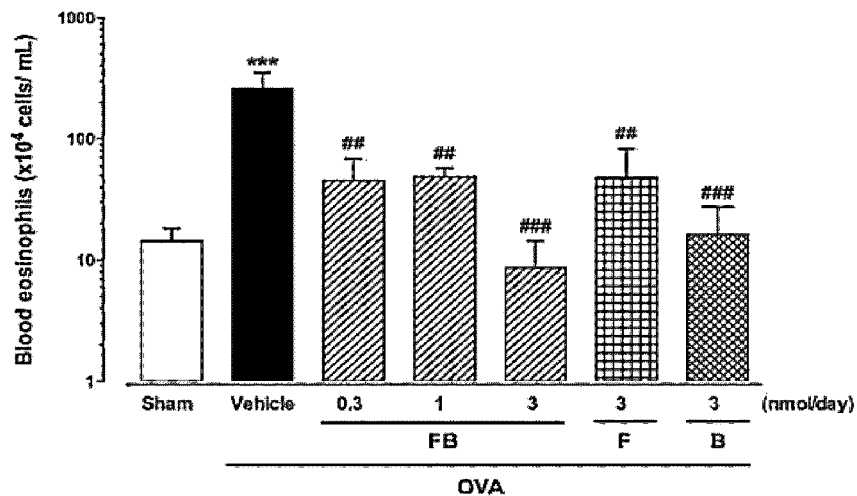
Figure 13B:
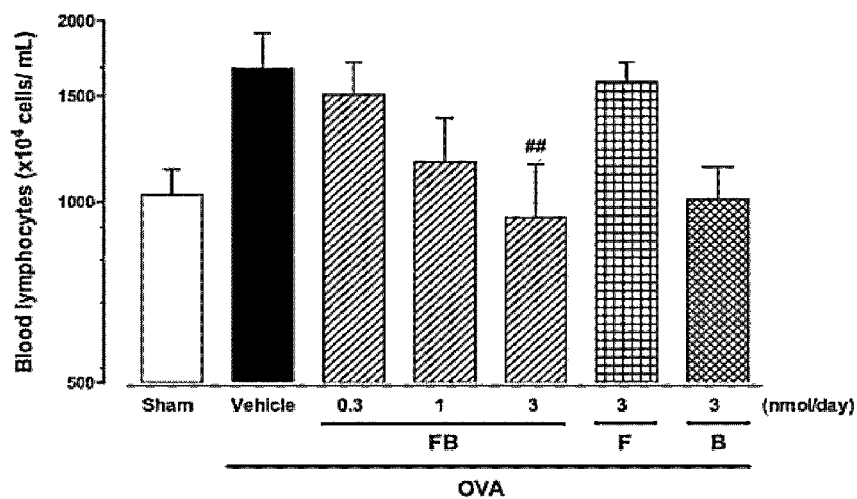
Figure 13C:
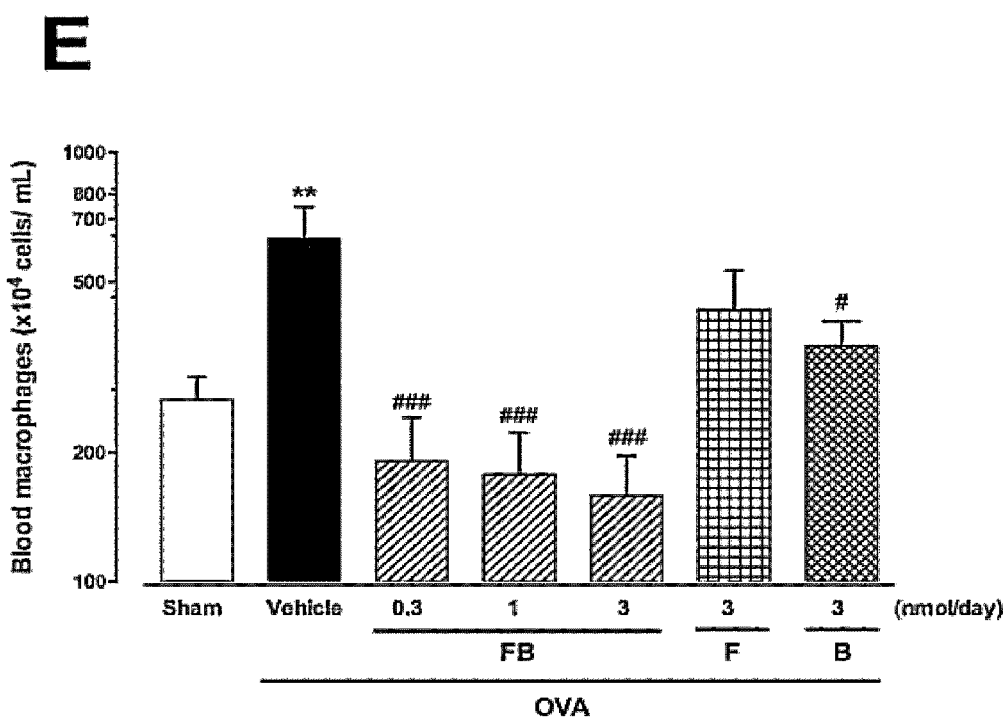

FIGS. 13A, 13B and 13C shows that OVA-induced allergy significantly increased the number of total leukocytes in the collected blood samples (panel A). This response was significantly reduced only in the animals receiving FB (at the 3 nmol/animal dose) but not by the other treatments. Similarly, with respect to lymphocytes, only the animals treated with 3 nmol/day of FB showed a lower number of circulating cells than the untreated allergic animals (Panel D). FIG. 13B shows that all the treatments reduced the number of circulating eosinophils. Treatment with either B or FB (at all the tested doses) significantly reduced the number of macrophages, although only FB (at all the tested doses) reduced the number of these cells to values lower than those observed in the control animals (Panel D). On the other hand, there were no statistically significant differences in terms of circulating neutrophils among the experimental groups (Panel C).

3. Experimental Groups III 3.1 Lung Hyperreactivity/Penh Function

Figure 14A:
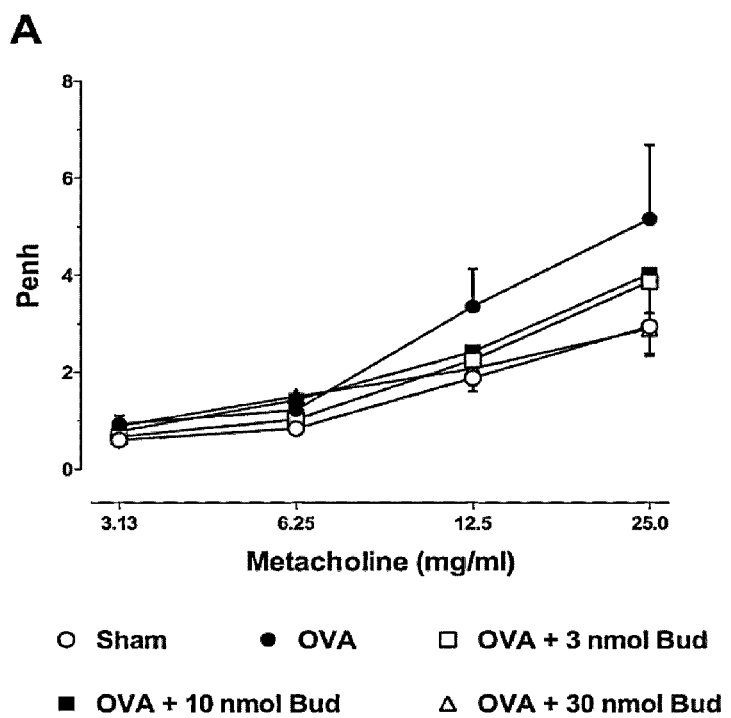
Figure 14A:
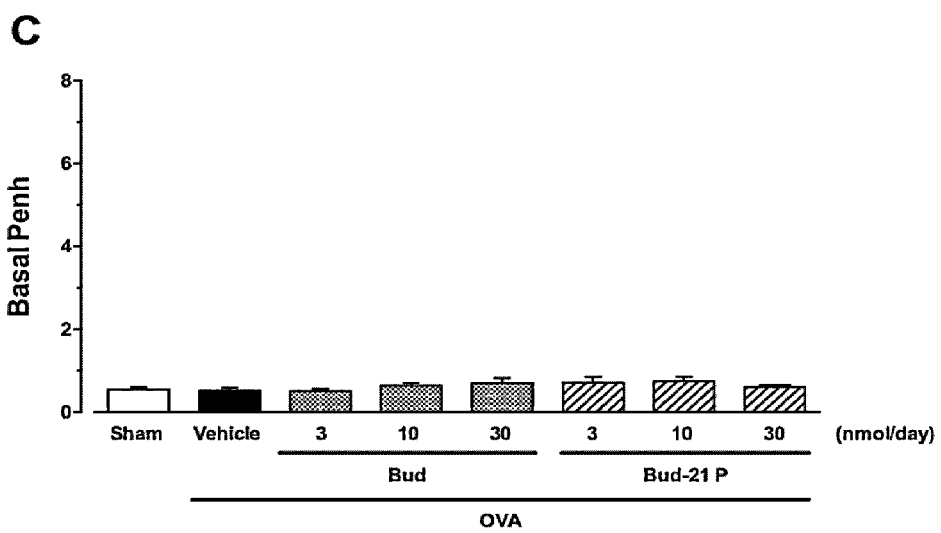
Figure 14B:
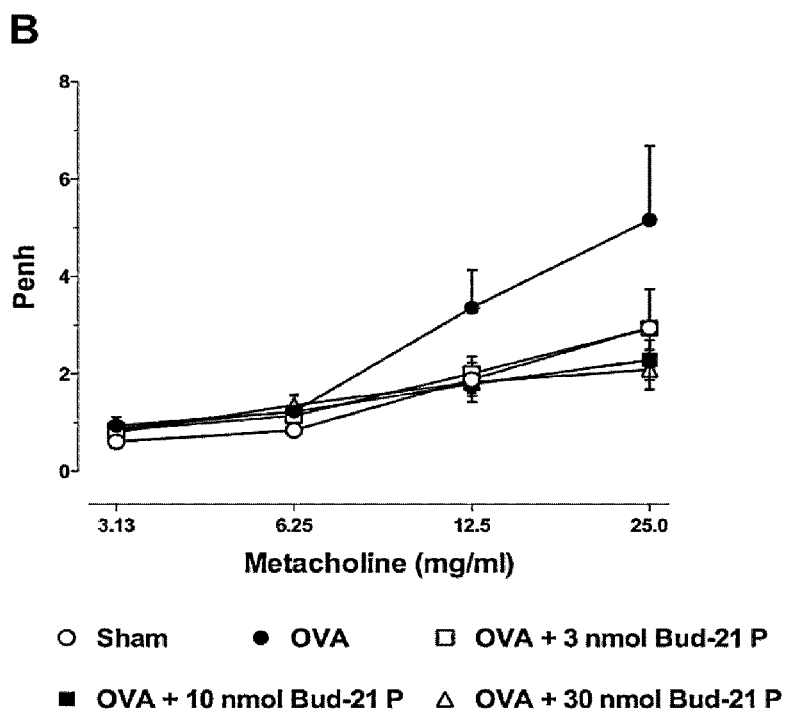
Figure 14B:
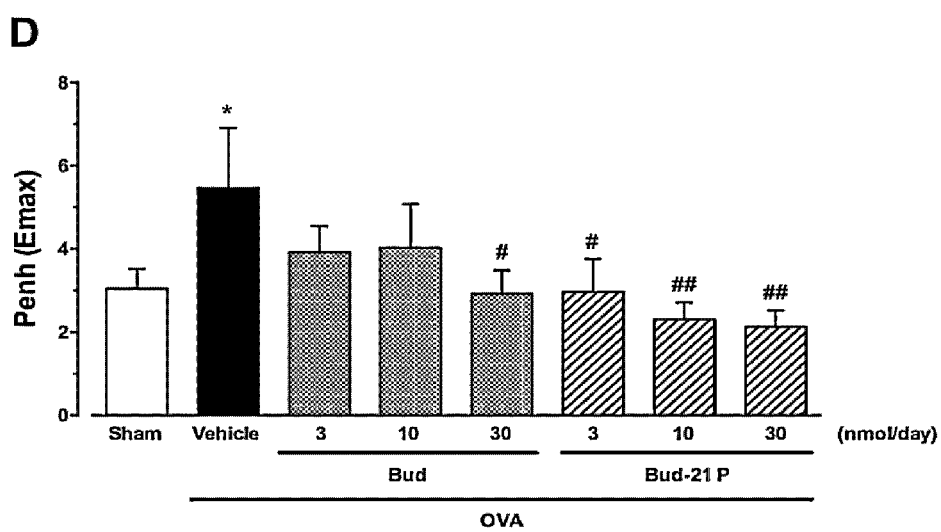
Figure 14C:
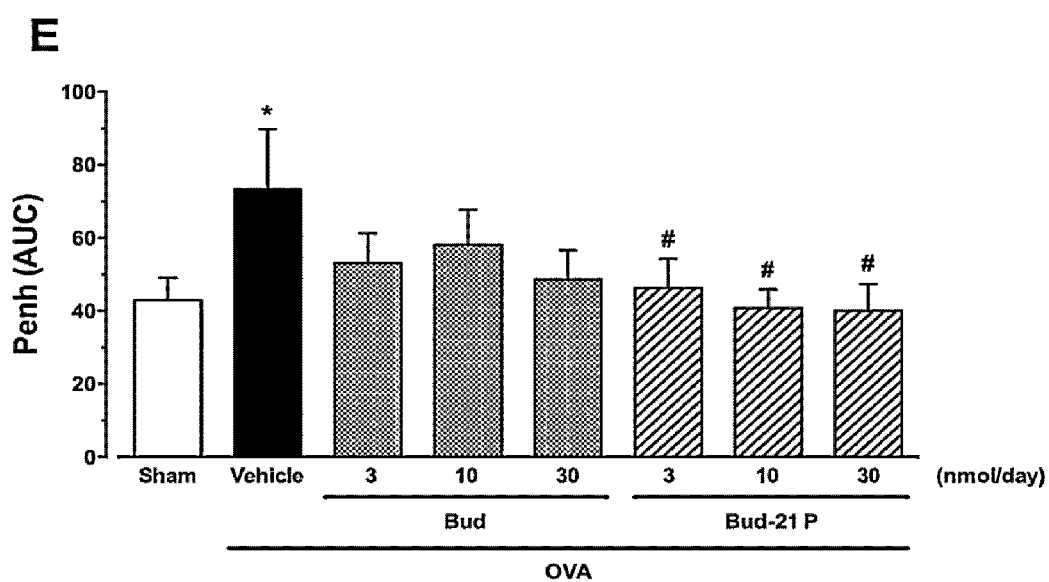

OVA-induced allergy significantly increased airway responsiveness, as assessed by the Penh measurement following the exposure to increasing concentrations of inhaled methacholine (profiles shown in FIGS. 14A, 14B and 14C, Panels A and B), as evidenced by the increased area under the Penh-metacholine concentration curve (AUC; Panel E) and maximal response (Emax; Panel D). Basal Penh (i.e., under no methacholine exposure) was not significantly different among the groups.

Both Penh parameters (AUC and Emax) were significantly reduced by the budesonide 21-phosphate (Bud-21 P) at all the tested doses (3, 10 and 30 nmol/animal/day), while treatment with the parent compound Bud resulted in significant reduction of this response just at the highest dose (30 nmol/animal/day).

3.2 BAL Fluid Cell Counts

Figure 15A:
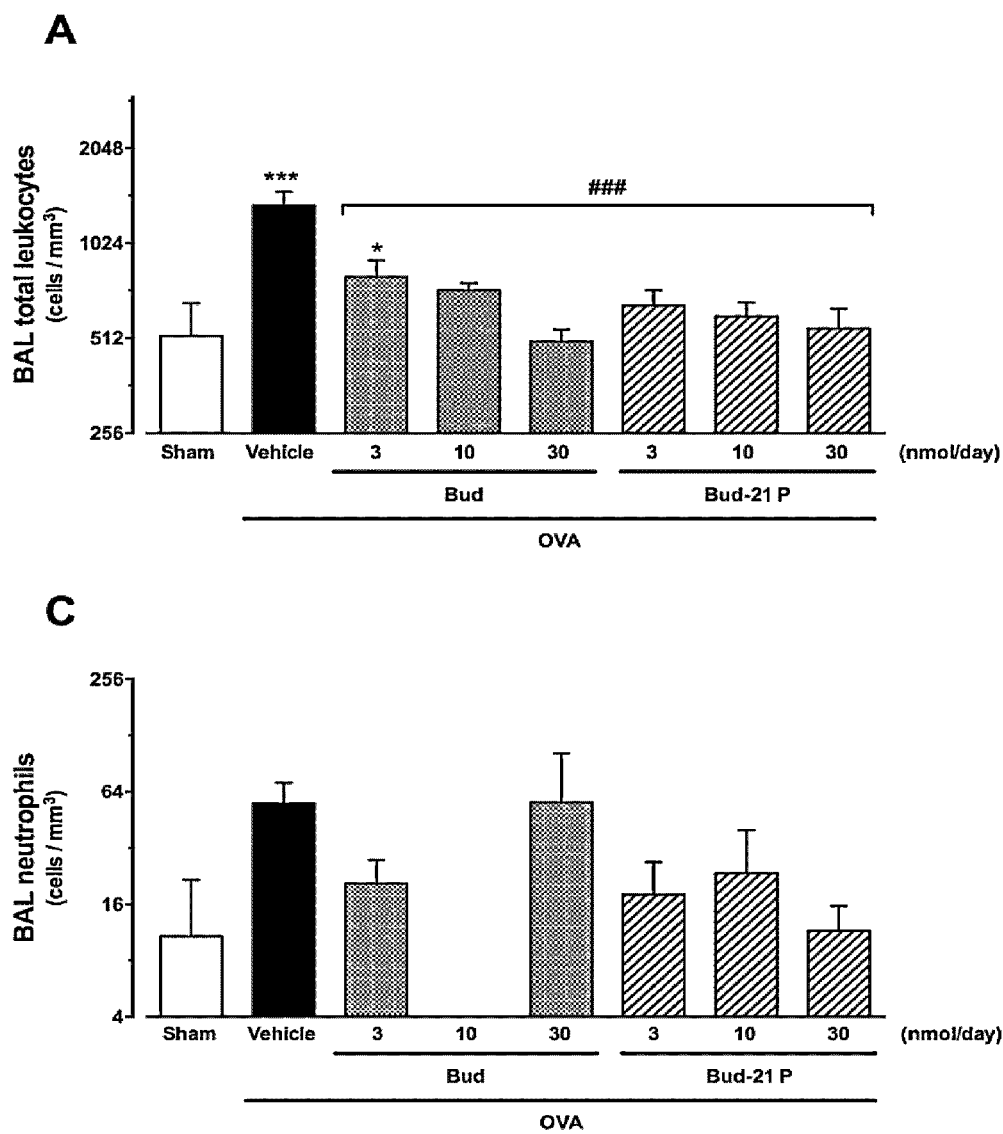
FIGS. 15A, 15B and 15C. Comparative effects of budesonide (Bud) and Its 21-phospate (Bud-21 P) total and differential leukocytes counts in BAL fluid from mice with OVA-induced allergic asthma. BAL fluids were collected from untreated Sham and OVA-induced allergic animals after the daily administration of the compounds during 4 weeks (following the first OVA-challenge). Bars represent mean±SEM for n=5-6 animals/group. Panel A: total BAL leukocytes; panel B: BAL eosinophils; panel C: BAL neutrophils; panel D: BAL lymphocytes; panel E: BAL macrophages. Data were analysed by one-way ANOVA followed by the Fisher's LSD test for multiple mean comparisons. *P<0.05, P<0.01 and *P<0.001 vs. Sham; #P<0.05, ##P<0.01 and ###P<0.001 vs. untreated OVA group.
Figure 15B:
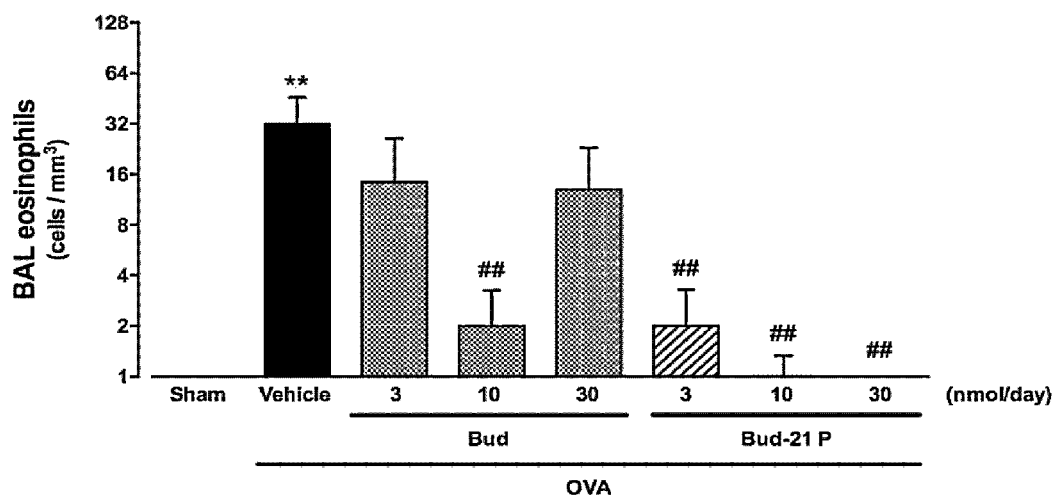
Figure 15B:
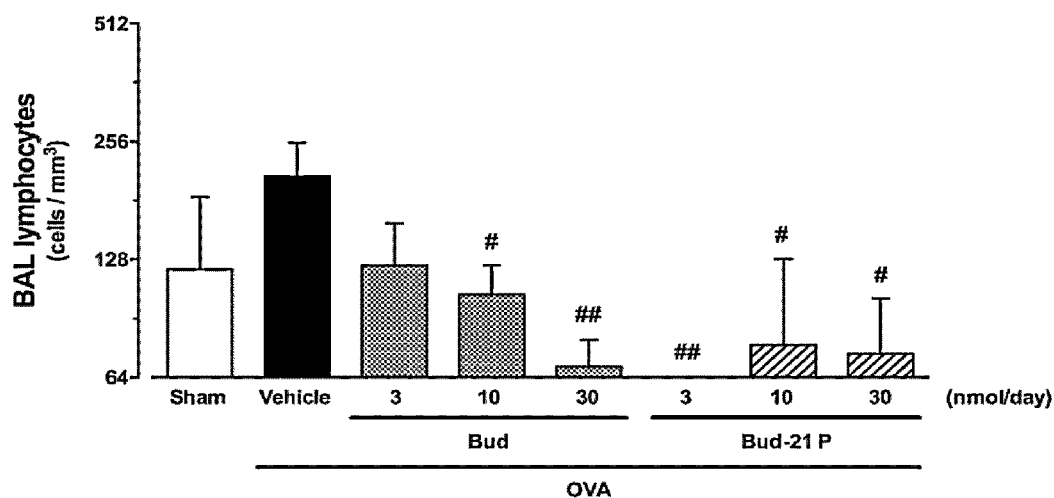
Figure 15C:
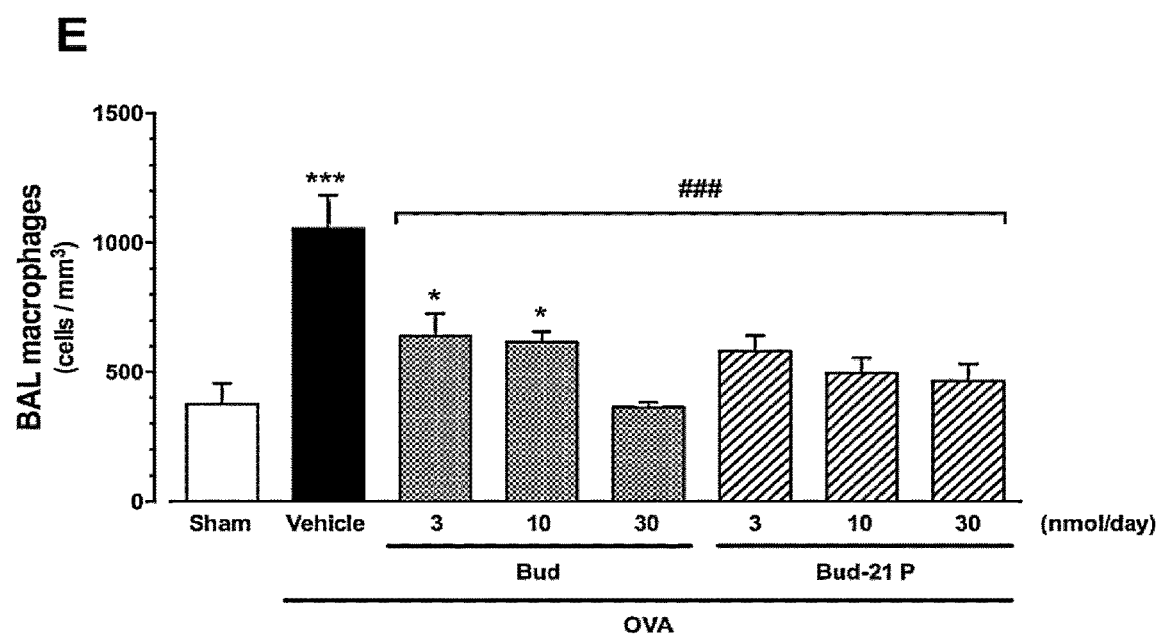

FIGS. 15A, 15B and 15C show that the animals with allergic asthma had higher number of total leukocytes recruited to the bronchoalveolar space in comparison with the Sham group, and that all treatments resulted in significant reduction of these numbers, although the response observed in the animals treated with Bud at the 3 nmol/animal/day dose was still significantly higher than that observed in the Sham mice (panel A). A more pronounced eosinophil migration to the lungs was observed in the allergic untreated animals, and all the treatments (except for Bud at 3 nmol/animal/day) significant reduced this cell recruitment (panel B). Macrophage recruitment to the bronchoalveolar space was also augmented in the allergic untreated animals, and this response was significantly reduced by all the treatments, although the responses of the animals treated with Bud at either 3 or 10 nmol/animal/day were still significantly higher than those observed in the Sham group (panel E). Untreated allergic animals showed no significant neutrophil (panel C) or lymphocyte (panel D) increase in the BAL fluids, although some of the treatments were capable of diminishing, or even abolishing, the migration of these cells to the bronchoalveolar space.

4. Experimental Groups IV 4.1 Cutaneous Edema

Figure 16:
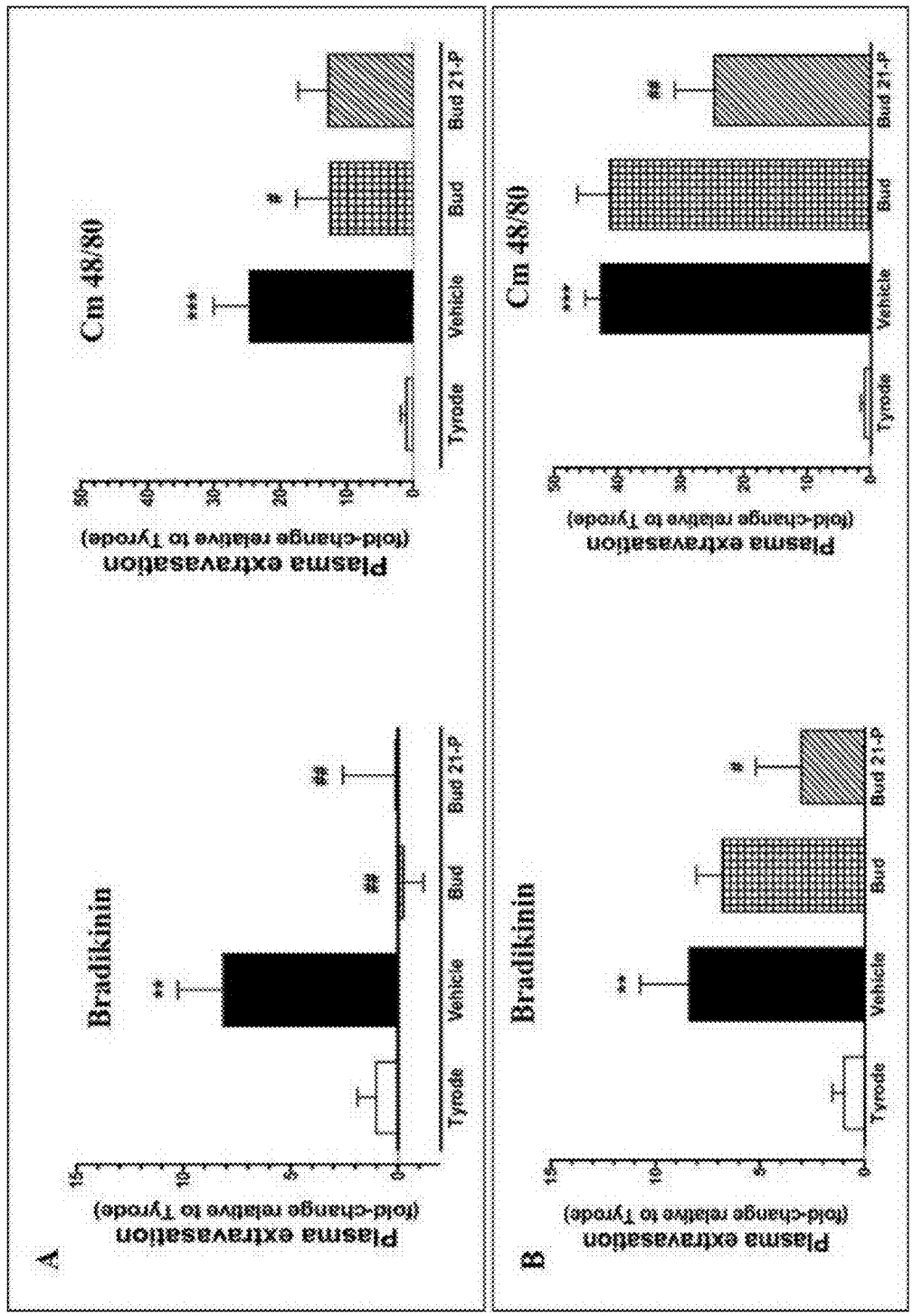
FIG. 16. Plasma extravasation was assessed by the Evans blue method, 30 min after the i.d. injection of the edema inducers. The animals were pre-treated (i.p.) with equimolar doses of the corticosteroids, 60 min before edema induction. Panel A shows the results obtained after treatment with 2.32 μmol/kg of each of the test compounds (equivalent to 1.0 mg/kg Bud and 1.2 mg/kg Bud 21-P). Panel B shows the results obtained after treatment with 0.70 μmol/kg of each of the test compounds (equivalent to 0.30 mg/kg Bud and 0.36 mg/kg Bud 21-P). P<0.01 and *P<0.001 vs. Tyrode; #P<0.05 and ##P<0.01 vs. Vehicle-treated group, as analysed by one-way ANOVA followed by the Fisher's test.

As shown in FIG. 16 (panel A and 8), both BK and C48/80 induced a significant plasma extravasation, measured 30 min after the injection. As shown in panel A, equimolar (2.32 μmol/kg) doses of the two compounds (equivalent to either 1.0 mg/kg Bud and 1.2 mg/kg Bud 21-P) administered 60 min before the i.d. injection of the edematogenic agents displayed a similar effect i.e. abolished BK-induced response or reduced, of approximately 50% C48/80-induced plasma extravasation. However, as shown in panel B, when the test compounds were administered at a lower equimolar dose 0.70 μmol/kg equivalent to 0.30 mg/kg Bud or 0.36 mg/kg Bud 21-P, Bud was ineffective on either BK or C48/80. Conversely, Bud 21-P significantly reduced the BK response and significantly inhibited C48180-induced edema.

CONCLUSIONS

The study has been conducted by using two models of allergic asthma. This approach has been used to better define the pharmacological profile of the new drugs since does not exist a single animal model that recapitulates all the human asthma features. Indeed, each single model gives some slightly different information that contributes to the definition of the pharmacological activity profile. The data obtained by the first set of experiments demonstrated a significant reduction of the bronchial hyperreactivity in the sensitized animals treated with intraperitoneal administration of either F or FB at the dose of 1 mg/Kg. Conversely B at the same dose had a lower effect on the allergen-induced airway hyperresponsiveness. Furthermore, allergen nebulization induced also a significant reduction in the bronchial relaxation to salbutamol. FB significantly ameliorated bronchial relaxation restoring pharmacological response to salbutamol. Otherwise the pretreatment with F or B did not prevent the lack of bronchial response to salbutamol. Thus, FB demonstrated a significant efficacy in preserving airway dysfunction when compared to the parent compounds F or B at the same dose. Blood was collected by intracardiac puncture and plasma IgE levels measured. As evident both treatment with B and FB significantly reduced OVA induced increase of IgE plasma levels, confirming the efficacy of B to prevent IgE-mediated immune response also when combined with F.

In the second set of experiments we tested the intranasal efficacy of FB.

OVA-induced allergic asthma resulted in increased airway responsiveness, as assessed by the Penh measurement, which was abolished in the animals treated with FB at 0.3, 1 or 3 nmol/animal/day, when analyzed as either Emax or AUC. For the sake of comparisons, only the maximal response Emax was partly reduced by F when administered at 3 nmol/animal, while at this equimolar dose, B showed no effect. Considering the effects of FB on the bronchoconstriction induced by MCh in allergic mice when administered at doses up to ten times lower than the parent compounds F and B, it is clear the advantage that the salt FB offers over the parent compounds.

As expected, this allergic condition is also characterized by increased number of eosinophils recruited to the bronchoalveolar space, which was significantly controlled by treatment with FB at all the doses (showing a clear dose-response pattern), as well as B and F. In addition, both FB and B at the 3 nmol/animal dose were also effective to abolish the increase in the number of macrophages induced by OVA.

OVA-induced allergic asthma also resulted in increased number of circulating leukocytes, which was almost abolished only by FB at the 3 nmol/animal dose. Increased circulating eosinophils in the untreated allergic mice were also decreased by FB treatment at all the tested doses, showing a dose-dependent pattern (at the highest dose, the number of circulating eosinophils was even lower than in the control Sham animals). This was also the case with circulating macrophages, and this potent lowering effect was observed even with the 0.3 nmol/animal dose, while B only caused a mild decrease of circulating macrophages at the 3 nmol/animal dose and F was devoid of any effect.

It is worthwhile mentioning that the compound doses were calculated with basis on previously published results using our model of ovalbumin-induced asthma in mice.

Regarding formoterol, the dose ranges from 0.5 to 3.8 μg/animal, while the usual doses for budesonide inhalation are in the range 8-75 μg/animal. In this way, it is clear that the F dose used in the present study (3 nmol/animal equivalent to 1.03 μg/animal) is within the lowest values of the therapeutic range, and that the same molar dose of budesonide (equivalent to 1.53 μg/animal) is well outside and below the therapeutic dose range. Considering that F and B are in the molar 1:1 ratio, we decided on the FB doses to be used with basis on those of F (otherwise, systemic effects due to F, mainly cardiac, should appear if the molar doses were considered with basis on those usually employed for B).

In this way, considering that the lowest FB dose tested showed significant beneficial effects (both in terms of respiratory function and on the number of circulating leukocytes and cell recruitment to the lungs), which were either comparable or even superior to those of B or F alone, we suggest that a positive synergism between F and B accounts for the beneficial effects of the compound FB in our murine models of OVA-induced allergic asthma.

Considering the bronchoconstriction response to methacholine (as assessed by the Penh function), the results of Experimental Groups III show that the beneficial therapeutic effects observed with the lowest dose of 21-phosphate budesonide (3 nmol/animal/day) were absent when budesonide was administered at even higher molar doses (i.e, 3 and 10 nmol/animal/day). A similar situation was observed regarding leukocyte recruitment to the bronchoalveolar space (as assessed by lavage), specially eosinophils (which are the main leukocyte type involved in allergic responses), as well as to macrophages or even total leukocytes.

Considering the cutaneous edema, the results of Experimental Groups IV show that Bud was ineffective on either BK or C48/80. Conversely, Bud 21-P significantly reduced the BK response and significantly inhibited C48/80-induced edema.

In conclusion, these facts clearly evidence that the 21-phosphate budesonide is more potent than parent budesonide to exert their beneficial effects in mice with OVA-induced allergic asthma and in cutaneous induced edema.

REFERENCES

[1]. H. S. Ali, P. York, N. Blagden, S. Soltanpour, W. E. Acree Jr., and A. Jouyban, "Solubility of budesonide, hydrocortisone, and prednisolone in ethanol+water mixtures at 298.2 K," Journal of Chemical and Engineering Data, vol. 55, no. 1, pp. 578-582, 2010

[2]. Barnes P. J. Scientific rationale for combination inhalers with a long-acting b2-agonists and corticosteroids. Eur. Respir. J. 2002; 19: 182-191

[3]. Mak J. C. W., Nishikawa M., Shirasaki H., Miyayasu K., Barnes P. J. Protective effects of a glucocorticoid on down-regulation of pulmonary b2-adrenergic receptors in vivo. J. Clin. Invest. 1995; 96: 99-106

[4]. Mak J. C., Chuang T. T., Harris C. A., Barnes P. J. Increased expression of G protein-coupled receptor kinases in cystic fibrosis lung. Eur. J. Pharmacol. 2002; 436: 165-172

[5]. Garbaccio, R. M. et al. Phosphate based linkers for intracellular delivery of drug conjugates. PCT Int. Appl. (2015), WO 2015153401.

[6]. Kem J C, Dooney D, Zhang R. Liang L, Brandish P E, Cheng M, Feng G, Beck A, Bresson D, Firdos J, Gately D, Knudsen N, Manibusan A, Sun Y, Garbaccio R M. Bioconjugate Chem. 2016, 27, 2081-2088.

[7]. Kern J C, Cancilla M, Dooney D, Kwasnjuk K, Zhang R, Beaumont M, Figueroa I, Hsieh S, Liang L, Tomazela D, Zhang J, Brandish P E, Palmieri A, Stivers P, Cheng M, Feng G, Geda P, Shah S, Beck A, Bresson D, Firdos J, Gately D, Knudsen N, Manibusan A, Schultz P G, Sun Y. Garbaccio R M. Discovery of Pyrophosphate Diesters as Tunable, Soluble, and Bioorthogonal Linkers for Site-Specific Antibody-Drug Conjugates. J. Am. Chem. Soc. 2016, 138, 1430-1445

[8]. Brandish, P. E. et al. Antibody drug conjugate for anti-inflammatory applications. PCT Int. Appl. (2017), WO 2017062271.

[9]. Santos K t, Florenzano J, Rodrigues L, Fávaro R r, Ventura F f, Ribeiro M g, Teixeira S a, Ferreira H h, Brain S d, Damazo A s, Zorn T m, Cámara N o, Muscará M n, Peron J p, Costa S k (2014). Early postnatal, but not late, exposure to chemical ambient pollutant 1,2-naphthoquinone increases susceptibility to pulmonary allergic inflammation at adulthood. Archives of Toxicology, 88: 1589-1605.

[10]. Costa S K, Starr A, Hyslop S. Gilmore D, Brain S D (2006). How important are NK1 receptors for influencing microvascular inflammation and itch in the skin?Studies using Phoneutria nigriventer venom. Vasc. Pharmacol; 45: 209-214.

[11]. Yshii L M, Souza GHMF, Camargo E A, Eberlin M N, Ribela MTCP, Muscará M N, Hyslop S, Costa SKP (2009). Characterization of the mechanisms underlying the inflammatory response to *Polistes* lanio lanio (paper wasp) venom in mouse dorsal skin. Toxicon; 53:42-52.

The invention claimed is:

1. A salt of budesonide 21-phosphate with a β2 adrenergic agonist, wherein the β2 adrenergic agonist is Formoterol, which is in crystalline form IV characterized by an X-ray powder diffraction spectrum, which is obtained by using CuKα radiation and represented by °2θ angle, having characteristic peaks at about 5.82, 8.21, 11.67, 13.02, 13.54, 14.17, 14.87, 16.40, 16.92, 18.39, 19.69, 20.15, 20.65, 21.41, 22.28, 23.41, 23.69, 24.16, 24.77, 25.27, 26.41, 27.38, 27.84, 28.58, 30.15, 31.69, 33.58, 34.41, 35.47, 36.02, 37.59, 38.63 2theta±0.20 degrees.

2. The salt according to claim 1, wherein the β2 adrenergic agonist is selected from the group consisting of short-acting β2 agonists, long-acting β2 agonists and ultra-long-acting β2 agonists.

3. The Formoterol salt of budesonide 21-phosphate according to claim 1, which is in crystalline form IV characterized by an X-ray powder diffraction spectrum as represented in FIG. 8.

4. A process for the preparation of the salt according to claim 1, comprising the steps of:
   i) dissolving or suspending budesonide 21-phosphate in an organic solvent;
   ii) adding a β2 adrenergic agonist under stirring;
   iii) isolating the salt of budesonide 21-phosphate with the β2 adrenergic agonist.

5. The process according to claim 4, wherein the β2 adrenergic agonist is Formoterol.

6. The process according to claim 4, wherein the organic solvent is selected from the group consisting of $C_1$-$C_4$ aliphatic alcohols, $C_2$-$C_6$ aliphatic ketones, $C_4$-$C_8$ aliphatic ethers, $C_4$-$C_6$ cyclic ethers, $C_3$-$C_8$ aliphatic esters, $C_5$-$C_8$ hydrocarbons, $C_1$-$C_4$ chlorinated hydrocarbons, aliphatic $C_2$-$C_4$ nitriles and mixtures thereof.

7. The process according to claim 6, wherein the organic solvent is selected from the group consisting of methanol, ethanol, isopropanol, acetone, methyl ethyl ketone, methyl isopropyl ketone, diethyl ketone, diethyl ether, diisopropyl ether, ditertbutyl ether, tetrahydrofuran, dioxane, ethyl acetate, toluene, xylene, pentane, hexane, heptane, dichloromethane, chloroform, dichloroethane, acetonitrile and mixtures thereof.

8. The process according to claim 4, wherein the mmol/ml ratio between budesonide 21-phosphate and the organic solvent is from 1:20 to 1:40.

9. The process according to claim 8, wherein the mmol/mL ratio between budesonide 21-phosphate and the organic solvent is 1:30.

10. The process according to claim 4, wherein the molar ratio between budesonide 21-phosphate and the β2 adrenergic agonist is from 1:1 to 1:1.5.

11. The process according to claim 4, wherein the isolation step iii) is carried out by adding an anti-solvent selected from $C_5$-$C_8$ aliphatic straight chain hydrocarbons, including hexane, $C_4$-$C_6$ cyclic ethers, including diethyl ether, and mixtures thereof.

12. The process according to claim 11, wherein the volume ratio of the organic solvent to the anti-solvent is from 2:1 to 1:2.

13. The process according to claim 12, wherein the volume ratio of the organic solvent to the anti-solvent is 1:1.

14. The process according to claim 4, wherein the isolation step iii) is carried out by crystallization.

15. The process according to claim 14, wherein the isolation step ill) is carried out by crystallization from n-hexane.

16. The process according to claim 4, further comprising a drying step at a temperature ranging from 30 to 80° C.

17. The process according to claim 16, wherein the drying step is carried out at a temperature ranging from 40-50° C.

18. A pharmaceutical composition comprising the salt according to claim 1, in combination with at least one physiologically acceptable excipient.

19. The pharmaceutical composition according to claim 18, wherein the composition is in the form of a powder, a suspension or a solution.

20. A method of treating a condition selected from the group consisting of respiratory inflammatory pathologies, obstructive pathologies, allergen-induced airway dysfunctions, including asthma, COPD and pulmonary fibrosis in a subject in need thereof, comprising administration of an effective amount of the salt according to claim 1, alone or in combination with one or more physiologically acceptable excipients.

\* \* \* \* \*